United States Patent
Meyer et al.

(10) Patent No.: US 10,136,170 B2
(45) Date of Patent: Nov. 20, 2018

(54) SYSTEMS AND METHODS FOR NON-LINEAR OPTIMIZATION OF AUDIENCE REACH

(71) Applicant: Rovi Guides, Inc., Santa Clara, CA (US)

(72) Inventors: Samuel Meyer, Boston, MA (US); Randall Kelley, Belmont, MA (US); Matthew Emans, Boston, MA (US); Walter R. Klappert, Los Angeles, CA (US); Steven Bennett, Somerville, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 14/815,635

(22) Filed: Jul. 31, 2015

(65) Prior Publication Data

US 2016/0373793 A1 Dec. 22, 2016

Related U.S. Application Data

(60) Provisional application No. 62/180,934, filed on Jun. 17, 2015.

(51) Int. Cl.
| | |
|---|---|
| *H04H 60/32* | (2008.01) |
| *H04N 21/25* | (2011.01) |
| *G06Q 10/04* | (2012.01) |
| *G06Q 30/02* | (2012.01) |
| *H04N 21/2668* | (2011.01) |
| *H04N 21/81* | (2011.01) |

(52) U.S. Cl.
CPC ........... *H04N 21/252* (2013.01); *G06Q 10/04* (2013.01); *G06Q 30/0201* (2013.01); *G06Q 30/0241* (2013.01); *G06Q 30/0273* (2013.01); *G06Q 30/0276* (2013.01); *H04N 21/2668* (2013.01); *H04N 21/812* (2013.01)

(58) Field of Classification Search
CPC ..................... G06Q 10/06315; G06Q 30/0244
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |

(Continued)

OTHER PUBLICATIONS

Anonymous "Rovi Ad Optimizer" URL: https://web.archive.org/web/20150315021854/http:www.rovicorp.com/products-and-solutions/products/analytics/ad-optimers.htm, Mar. 15, 2015 pp. 1-3.

*Primary Examiner* — Olugbenga O Idowu
(74) *Attorney, Agent, or Firm* — Haley Guiliano LLP

(57) ABSTRACT

Methods and systems are disclosed for an optimization system that recommends amounts of resources for use in reaching viewers during a media asset. The optimization system, using control circuitry, receives a user input of a first value of a resource and determines a first rate at which a number of unique household viewers reached during a first media asset changes for the first value. The optimization system compares the first rate to a threshold rate and determines whether the first rate equals or exceeds the threshold rate. The optimization system, in response to determining that the first rate does not equal or exceed the threshold rate, recommends a second value to the user.

20 Claims, 10 Drawing Sheets

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 7,949,565 B1 | 5/2011 | Eldering et al. |
| 8,046,801 B2 | 10/2011 | Ellis et al. |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2010/0153885 A1 | 6/2010 | Yates |
| 2012/0310728 A1* | 12/2012 | Kagan ............... G06Q 30/02 705/14.43 |
| 2014/0049685 A1 | 2/2014 | Chen |
| 2014/0049695 A1 | 2/2014 | Papish et al. |
| 2014/0058785 A1* | 2/2014 | Aronowich ........ G06Q 30/0244 705/7.25 |
| 2014/0279781 A1 | 9/2014 | Ling et al. |
| 2014/0289017 A1 | 9/2014 | Trenkle et al. |
| 2015/0037013 A1 | 2/2015 | Thomas et al. |
| 2016/0165277 A1 | 6/2016 | Kirillov et al. |

* cited by examiner

600

```
600 ...
601 Initialization Subroutine
602 ...
603 //Routine to process user input of a first value:
604
605   Receive instance of a user input of a first value
606
607     A = Determined first rate based on first value received from user
608     B = Accessed value of stored threshold rate
609         If (A >= B)
610             Execute Subroutine to recommend the first value to the user
611         Else If (A < B)
612             Execute Subroutine to determine a second rate
613             C = Second rate
614             Loop (C < B)
615                 Execute Subroutine to determine a new second rate
616             Execute Subroutine to recommend second value based on second
        rate to the user
617 ...
618 Termination Subroutine
619 ...
```

800 ...
801 Initialization Subroutine
802 ...
803 //Routine to determine a second value using a graphical relationship
804
805  Receive instances of media assets
806  For each instance of the media assets:
807      Query database containing graphical relationships corresponding to media assets for a graphical relationship matching the current media asset
808
809      Determine a value of a second rate using the graphical relationship
810
811      If (Second rate < Threshold rate)
812              Repeat loop using a different media asset
813      Else
814              Recommend a second value corresponding to the second rate to the user
815              If (Sum of all recommended values < User input value)
816                  Repeat loop using a different media asset
817 ...
818 Termination Subroutine
819 ...

FIG. 8

SYSTEMS AND METHODS FOR NON-LINEAR OPTIMIZATION OF AUDIENCE REACH

CROSS REFERENCE TO RELATED APPLICATION

This disclosure claims the benefit under 35 U.S.C. § 119(e) of U.S. Provisional Application No. 62/180,934, filed Jun. 17, 2015, which is incorporated herein by reference in its entirety.

BACKGROUND

Advertisement campaign managers have the task of allocating resources to different media assets to efficiently reach an intended audience. Advertisement campaign managers, in creating advertisement campaigns, use the resources to place their advertisements in the advertisement placement locations. However, traditional methods for creating advertisement campaigns may use an unnecessarily large amount of resources to reach the intended audience, which may be inefficient because a smaller amount of resources could be used to achieve the same result. Traditional methods for creating advertisement campaigns may also rely on advertisement campaign managers to indicate how resources should be allocated between multiple media assets, which may result in suboptimal allocations because campaign managers may allocate resources to media assets that will not efficiently reach an intended audience.

SUMMARY

Accordingly, methods and systems are disclosed herein for recommending amounts of resources for use in reaching viewers during a media asset. Unlike conventional systems, which simply suggest a user should use a maximum value of resources to create a campaign, or should try to reach the maximum number of people possible, the optimization system discussed herein takes into account efficiencies of advertising campaigns. The optimization system uses the methods and systems discussed herein to recommend a value of an amount of a resource to a user after taking into account diminishing rates of return for additional resources used for an advertising campaign. This will ensure the user does not use unnecessary resources in a campaign when doing so will not result in a substantial increase in audience reach. This limits resources required by the user, hence providing savings to the user, while simultaneously allowing the user to reach an audience efficiently.

The optimization system may use these methods and systems to recommend amounts of resources to an advertisement campaign manager. In some aspects, the optimization system may receive a user input of a first value, wherein the first value corresponds to a first amount of a resource a user desires to use to reach unique household viewers during a first media asset. For example, the optimization system may receive a user input of a value of 100 dollars, indicating that the user wishes to spend a maximum of 100 dollars to reach unique household viewers during a first media asset. The optimization system may use the 100 dollars to purchase advertising instances or slots during a first media asset, such as a television show. In some embodiments, the resource may be an available number of advertising instances appearing in the first media asset. For example, the optimization system may receive user input indicating the user wishes to use a maximum of three advertising instances during a television show to reach unique household viewers.

The optimization system determines a first date at which a number of unique household viewers reached during the first media asset changes for the first value. For example, the optimization system may have received a user input of a first value of 100 dollars to reach unique household viewers during a television show. The optimization system may determine that, when 100 dollars are spent to buy advertising instances during the television show, each additional dollar spent results in 10 new unique household viewers being reached.

The optimization system may compare the first rate to a threshold rate, wherein the threshold rate corresponds to an acceptable minimum rate at which the number of unique household viewers reached during the first media asset may change. For example, the optimization system may determine that, when 100 dollars are spent to buy advertising instances during the television show described above, each additional dollar spent results in 10 new unique viewers. The optimization system may compare this rate of 10 new unique viewers per dollar to a threshold rate of 12 new unique viewers per dollar. The threshold rate may correspond to a situation when 80 dollars are spent to buy advertising instances during the television show. In some embodiments, the optimization system may determine whether the first rate equals or exceeds the threshold rate based on the comparing. For example, the optimization system may determine that the rate of 10 new viewers per dollar does not exceed the threshold rate of 12 new viewers per dollar.

The optimization system may, in response to determining that the first rate does not equal or exceed the threshold rate, recommend a second value to the user. For example, the optimization system may determine that a rate of 10 new viewers per dollar does not exceed a threshold rate of 12 new viewers per dollar as described above. The optimization system may recommend a second value of 80 dollars to the user. The optimization system may additionally generate an output indicating to the user that spending 80 dollars to reach unique household viewers will reach a larger number of viewers per dollar spent than spending 100 dollars as specified in the user input. Conventional systems may recommend to the user that the user should spend 100 dollars as the user can reach 100 audience members by spending 100 dollars, while the user can only reach 80 audience members by spending 80 dollars. However, the optimization system takes into account rates of reaching new viewers. Hence, the optimization system ensures the resources will be used to reach viewers more efficiently.

In some embodiments, the optimization system may retrieve a graphical relationship associated with the first media asset from a database that includes graphical relationships for a plurality of media assets. For example, the optimization system may retrieve a graphical curve associated with a television show depicting how many unique household viewers are reached for different amounts of resources spent on an advertising campaign. The graphical relationships may be created based on past advertising campaigns, mathematical modeling, or some combination of the two. By creating the graphical representation, the optimization system can model complex non-linear relationships between resources used and audience reach. This allows the optimization system to accurately determine a resource value by taking into account effects such as rates of diminishing return. In contrast, conventional systems often assume linear relationships between resources used and audience reach, which does not allow for them to recommend a resource value that can be used to efficiently reach an intended audience.

In some embodiments, the optimization system may, in response to determining that the first rate equals or exceeds the threshold rate, recommend the first value to the user. For example, the optimization system may receive a user input of a first value of 100 dollars, and determine that this value corresponds to a first rate of 10 new viewers per dollar. The optimization system may compare this rate to a threshold rate of 8 new viewers per dollar to determine that the first rate exceeds the threshold rate. In response, the optimization system may recommend the first value of 100 dollars to the user to be used in an advertisement campaign. This allows the user to only allocate resources to the first media asset that will be used efficiently to increase audience reach during the first media asset.

In some embodiments, the optimization system may recommend a second value by determining a second rate at which the number of unique household viewers reached during the first media asset changes for the second value, comparing the second rate to the threshold rate, and determining that the second rate exceeds or equals the threshold rate. For example, the optimization system may determine a first rate of 10 new viewers per dollar spent as described above for a first value of 100 dollars. The optimization system may determine that the first rate is less than a threshold rate of 12 new viewers per dollar spent. The optimization system may determine a second value of 70 dollars, and determine that this value corresponds to a rate of 13 new viewers per dollar spent. The optimization system may compare the second rate of 13 new viewers per dollar spent to the threshold rate of 12 new viewers per dollar spent and determine that the second rate exceeds the threshold rate. The optimization system may recommend the second value of 70 dollars to the user to be used to reach unique household viewers during a first media asset.

In some embodiments, the optimization system may select the threshold rate by determining an attribute of the first media asset and comparing the attribute to a database listing threshold rates corresponding to different attributes to identify the threshold rate. For example, the optimization system may determine that a television show during which a user wishes to reach unique household viewers is a comedy show. The optimization system may determine the television show has an attribute of "comedy". The optimization system may compare this attribute to a database containing a threshold of 10 new viewers per dollar for an attribute of "comedy" and 12 new viewers per dollar for an attribute of "drama". The optimization system may identify that the threshold rate should be 10 new viewers per dollar for current media asset with the attribute of "comedy". In some embodiments, the attribute may include a genre (e.g., comedy, drama, action), a title (e.g., Dance Moms, Dancing with the Stars, Project Runway), or a broadcast time (e.g., 8:00 am, 7:30 pm).

In some embodiments, the second value may correspond to a second amount of the resource the user desires to use to reach unique household viewers during a second media asset. For example, the optimization system may receive a user input of a first value of 100 dollars to be used to reach unique household viewers during a first television show. The optimization system may determine the rate associated with the first value does not exceed a threshold rate, and recommend that a second value of 80 dollars be used to reach unique household viewers during a second television show instead.

In some embodiments, the optimization system may recommend the second value by determining that the second amount is less than the first amount and the second rate is greater than the first rate. For example, the optimization system may receive a user input of a first value of 100 dollars to reach unique household viewers during a first television show. The first value may correspond to a rate of 10 new viewers per dollar. The optimization system may determine the first rate does not exceed a threshold rate of 11 new viewers per dollar, and that a second value of 80 dollars corresponds to a second rate of 12 new viewers per dollar, which exceeds the threshold rate. The optimization system may determine that the second amount is less than the first amount since 80 dollars is less than 100 dollars. The optimization system may also determine that the second rate is greater than the first rate, since 12 new viewers per dollar is a greater rate than 10 new viewers per dollar. The optimization system may then recommend the second value of 80 dollars to the user.

In some embodiments, the optimization system may determine a second rate associated with a second media asset for the first value. The optimization system may compare the first and second rates and recommend the media asset corresponding to the greater rate. For example, the optimization system may determine that for a value of 100 dollars, 10 new viewers per dollar are reached for a first television show and 8 new viewers per dollar are reached for a second television show. The optimization system may compare the two rates to determine the first rate is greater than the second rate, and may recommend the first media asset to the viewer based on the determination.

It should be noted that the systems and/or methods described above may be applied to, or used in accordance with, other systems, methods, and/or apparatuses.

BRIEF DESCRIPTION OF THE DRAWINGS

The above and other objects and advantages of the disclosure will be apparent upon consideration of the following detailed description, taken in conjunction with the accompanying drawings, in which life reference characters refer to like parts throughout, and in which:

FIG. 6 is pseudocode of illustrative steps for processing user inputs of amounts of resources in accordance with some embodiments of the disclosure;

FIG. 8 is pseudocode of an illustrative process for using a database to recommend a second value to the user in accordance with some embodiments of the disclosure;

DETAILED DESCRIPTION

Figure 1:
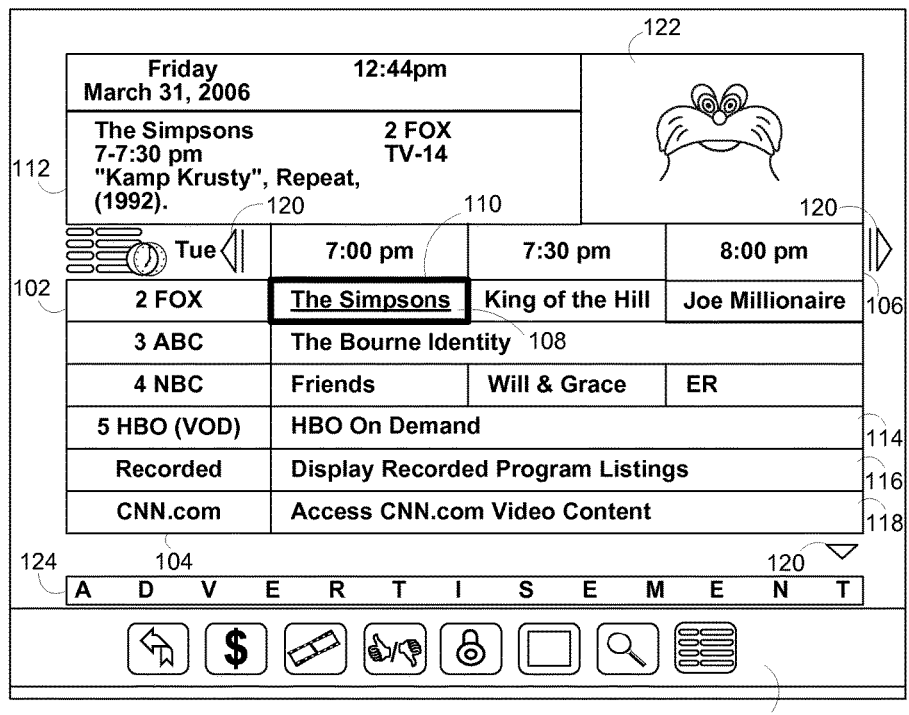
FIG. 1 shows an illustrative example of a display screen generated by a media guidance application in accordance with some embodiments of the disclosure.

When developing advertising campaigns, a campaign manager may aim to reach a maximum proportion of the audience while using minimal resources. Campaign managers may set priorities for the campaigns, wherein the priorities describe the targeted audience, the desired medium of advertising, and the desired proportion of audience to be reached. In some embodiments, campaign managers may create an advertising campaign manually, and then optimize the created campaign to maximize reach and minimize resources using a trial-and-error process and trying different resource values to see how audience reach changes. In some embodiments, an optimization system may receive the campaign manager's priorities and create an optimized advertising campaign that maximizes reach and minimizes resources.

The optimization system may determine, or retrieve from a database, a non-linear relationship between resources used in an advertisement campaign and the reach of the advertisement campaign. The optimization system may use this relationship to optimize advertising campaigns by recommending different resource values to the user that result in the audience being reached more efficiently for the resources spent. In some embodiments, the optimization system may increase the reach of an advertisement campaign without changing the resources used by the advertising campaign. In some embodiments, the optimization system may reduce the resources used by an advertisement campaign without changing the reach of the advertising campaign. In some embodiments, the optimization system may increase reach while reducing resources based on the non-linear relationship between reach and resources.

The advertising campaign may be implemented as advertisements incorporated into different types of media assets provided by a content delivery system. The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application. As referred to herein, an optimization system may be a form of a media guidance application. In some embodiments, the optimization system may use the media guidance application to provide information from campaigns to users. The optimization system may comprise the same components as the media guidance application, as described below.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
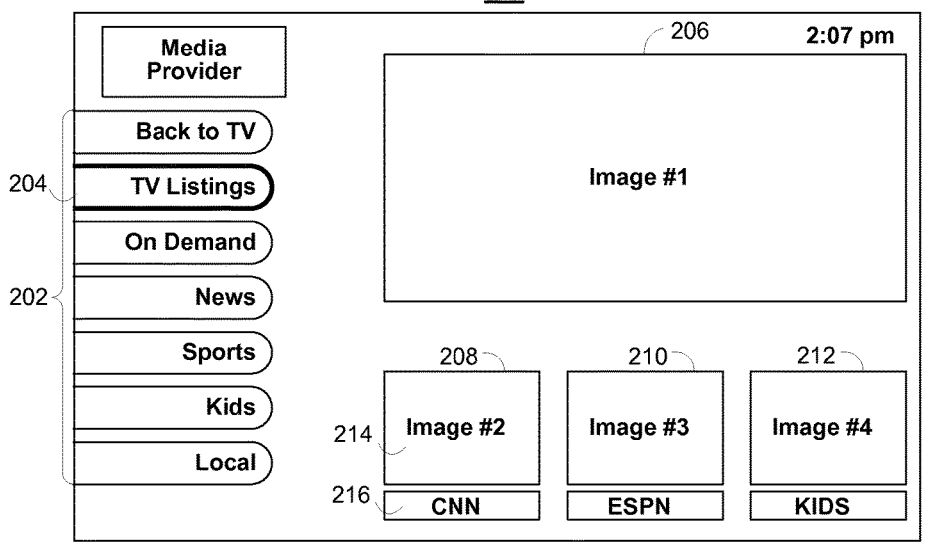
FIG. 2 shows another illustrative example of a display screen generated by a media guidance application in accordance with some embodiments of the disclosure.

FIGS. 1-2 show illustrative display screens that may be used to provide media guidance data. The optimization system may use the illustrative display screens in FIGS. 1-2 to provide information from a campaign to an audience. For example, the optimization system may place advertisements selected based on the techniques discussed herein in FIGS. 1-2. Additionally or alternatively, the optimization system may monitor the interactions of a user with FIGS. 1-2 to determine the number of unique household viewers during a given media asset. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
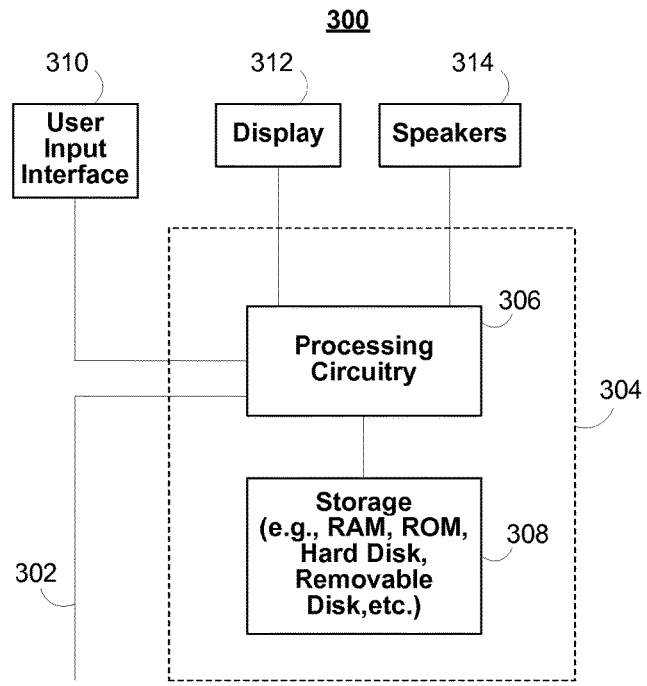
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
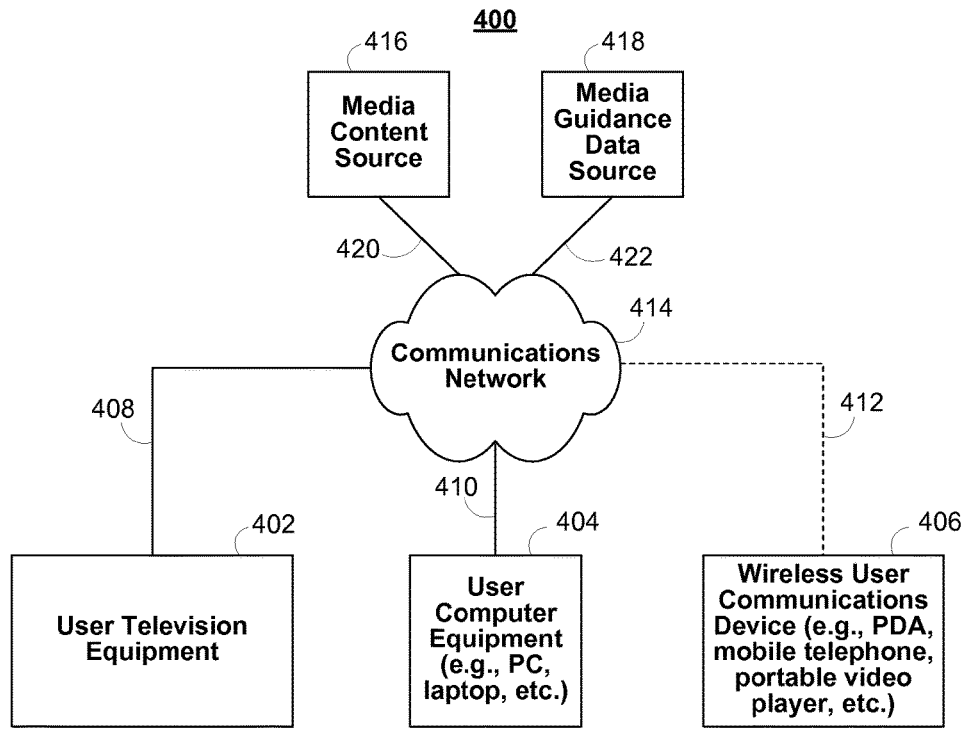
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred to herein, "optimization system" refers to a system as shown in FIG. 3. The system comprises control circuitry 304, which includes processing circuitry 306 and storage circuitry 308. The optimization system also comprises a user input interface 310. The optimization system also includes control circuitry 304 configured to communicate through communications network 414.

As referred to herein, a "campaign manager" refers to a person, organization, or apparatus that determines priorities for a campaign to distribute information to an audience. The information may include advertisements, data, media assets, promotional opportunities, or any other type of data. The campaign manager may determine priorities such as the targeted audience, the means to be used to reach the targeted audience, the budget to be spent in distributing the information, the goals to be achieved while distributing the information, or any other priorities that may be associated with the campaign. The campaign manager is also referred to as an "advertising campaign manager" and "user".

As referred to herein, "audience" refers to people who receive the information distributed in a campaign. The audience may be split into smaller groups based on geographical locations, ages, incomes, or other demographic classifiers of the people in the audience. "Audience" is also referred to as a "household audience" although it is understood that audiences may also consume media outside of a house, such as on wireless user communications devices 406 or at public places such as movie theatres.

As referred to herein, "resources" may include capital, labor, time, Gross Rating Points (GRP), advertising instances or slots, and the like. The optimization system may receive values for a maximum possible value of resources or a preferred value of resources to be used during a campaign from a campaign manager through user input interface 310. In some embodiments, the value of GRP may be directly proportional to a budget of a campaign manager.

As referred to herein, reach may be a measure of the portion of an audience that receives information distributed during a campaign. Reach may be measured as a percent of a total audience that receives the information. For example, if 40% of the population of New York City receives information about the weather in New York City on a particular day, the reach of the campaign to distribute weather information may be calculated to be 40%. In some embodiments, only unique audience members may count in the reach measurement. For example, if 10% of the population of New York City receives information about a sports game score once, and 10% of the population of New York City receives information about the sports game score twice, the reach of the information about the sports game score may be determined to be 20%.

Reach may be different from impressions. Impressions may refer to the number of times information is delivered to any audience members, not just unique audience numbers. Impressions may have a linear relationship to the amount of resources used. Reach may have a non-linear relationship to the amount of resources due to the laws of diminishing returns. In other words, the number of times information is delivered to unique viewers may increase more slowly as the amount of resources used increases.

In some embodiments, reach may include information about the number of times each unique audience member received information distributed during the campaign. For example, reach 3+ may represent the unique audience members who received information on three occasions.

In some embodiments, reach may describe the unique audience members of a particular demographic group that received information. For example, reach may refer only to females between ages 18 and 49 who received information about a clothing sale, not the number of people of all genders and ages who received information about the clothing sale.

As referred to herein, "attributes" of media assets refer to characteristics or information associated with media assets. In some embodiments, attributes of media assets may be retrieved from media guidance data source 418. In some embodiments, attributes of media assets may be retrieved by parsing signals received from media content source 416. In some embodiments, media assets may include tags or metadata describing their attributes. Attributes may include genre, title, broadcast time, actors, directors, broadcast channel, parental control ratings, reviews, or running length of media assets.

Figure 5:
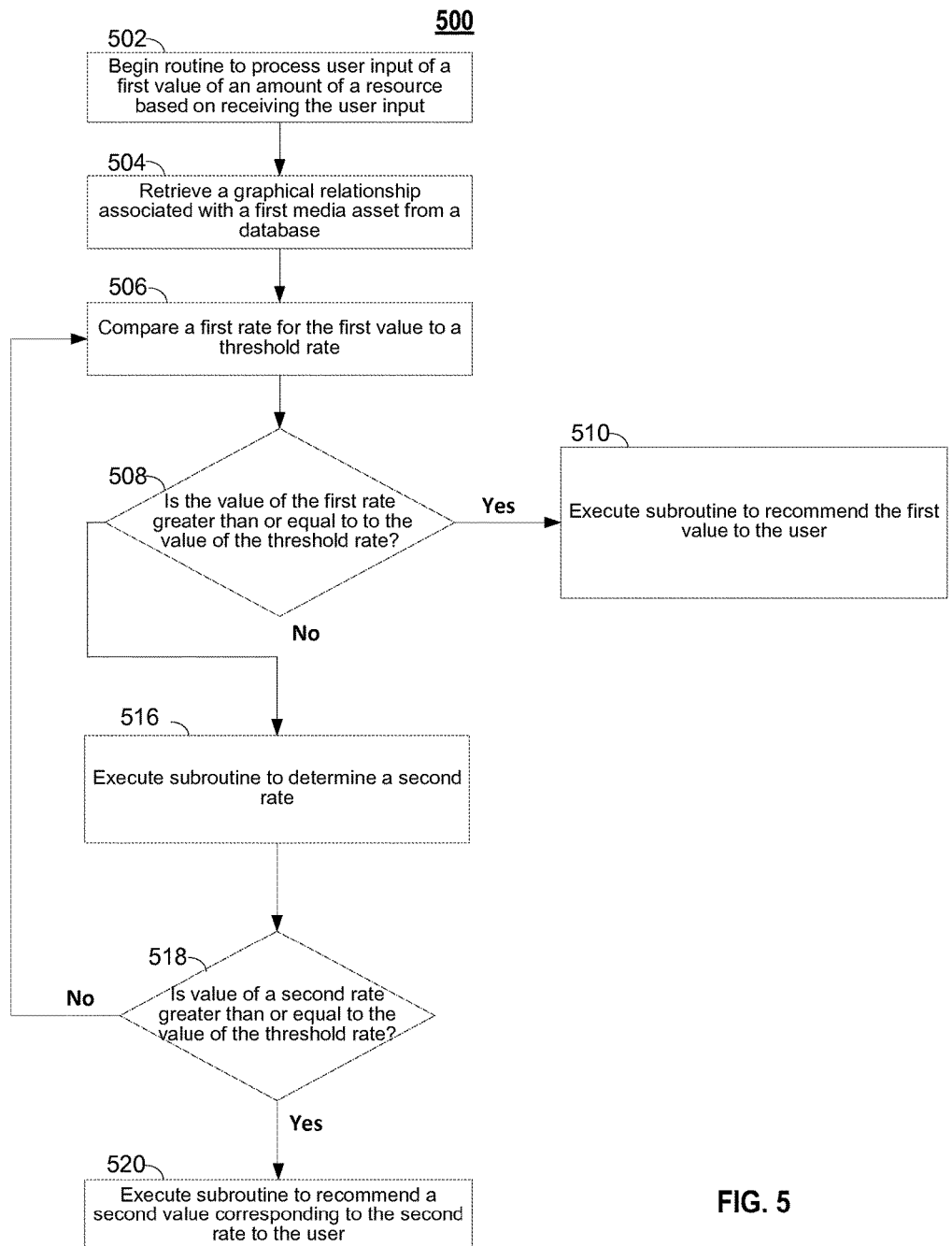
FIG. 5 is a flowchart of illustrative steps for processing user inputs of amounts of resources in accordance with some embodiments of the disclosure.

FIGS. 5 and 6 present a process through which the optimization system may process user input of a first value of an amount of a resource in accordance with some embodiments of the disclosure. In some embodiments, this process may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 5 describes process 500, which may be implemented on control circuitry (e.g., control circuitry 304) to process the received user input of the first value in accordance with some embodiments of the disclosure. The optimization system may receive the user input through user input interface 310.

At step 502, the optimization system will begin by receiving a user input of the first value. In some embodiments, this may be done either directly or indirectly in response to a user action or input (e.g., from signals received by control circuitry 304 or user input interface 310). For example, process 500 may begin directly in response to control circuitry 304 receiving signals from user input interface 310, or control circuitry 304 may prompt the user to confirm their input using a display (e.g., by generating a prompt to be displayed on display 312) prior to running the process.

At step 504, control circuitry 304 proceeds to retrieve a graphical relationship associated with a first media asset from a database listing graphical relationships indicating amounts of the resource used and corresponding unique household viewers reached for a plurality of media assets. In some embodiments, the optimization system may receive a user input identifying the first media asset during which the user desires to reach unique household viewers. In some embodiments, the optimization system may retrieve the graphical relationship from the database by comparing the first media asset with the plurality of media assets in the database to identify the graphical relationship associated with the first media asset. In some embodiments, the graphical relationship may resemble a curve as described in relation to FIGS. 9 and 10. In some embodiments, control circuitry 304 may receive a single data structure that represents the graphical relationship indicating amounts of resources used and corresponding numbers of unique household viewers reached for the first media asset. In some embodiments, the value may be stored as part of a larger data structure, and control circuitry 304 may retrieve the value by executing appropriate accessor methods to retrieve the value from the larger data structure. In some embodiments, the accessor methods may include indexing the database using the first media asset or an identifier of the first media asset.

In some embodiments, the optimization system determines a first rate at which a number of unique household viewers reached during the first media asset changes for the first value. For example, the optimization system may have received a user input of a value of 100 dollars to be used to reach unique household viewers during a television show "Dance Moms". The optimization system may determine that when 100 dollars are spent to reach unique household viewers during the television show "Dance Moms", each additional dollar spent will result in 10 new viewers. In some embodiments, the optimization system may determine a rate of new viewers per each dollar (or other unit of resource) already spent.

At step 506, control circuitry 304 proceeds to compare the value of the first rate (e.g., 10 new viewers per additional dollar spent as described above) to a threshold rate. In some embodiments, the optimization system may retrieve a threshold rate from a database listing threshold rates corresponding to different attributes of media assets. The optimization system may determine an attribute of the first media asset and identify the threshold rate associated with the attribute. For example, the optimization system may determine that the television show "Dance Moms" belongs to the genre "Reality Television" and retrieve a threshold rate of 8 new viewers per additional dollars spent corresponding to the genre "Reality Television" from a database. In some embodiments, the threshold rate may change from iteration to iteration based on the current media asset. In some embodiments, control circuitry 304 may directly compare the threshold rate with the first rate by accessing the values respectively from memory and performing a value comparison. In some instances, control circuitry 304 may call a comparison function (e.g., for object to object comparison) to compare the first rate and the threshold rate. For example, the optimization system may compare a first rate of 10 new viewers per additional dollar spent to a threshold rate of 8 new viewers per additional dollar spent.

At step 508, control circuitry 304 compares the values of the first rate and the threshold rate to determine if the value of the first rate is greater than or equal to the value of the threshold rate. If the condition is satisfied, the process may proceed to step 510; if the condition is not satisfied, the process may proceed to step 512 instead.

At step 510, control circuitry 304 will execute a subroutine to recommend the first value to the user based on the condition at step 508 being satisfied. In some embodiments, if the first value is equal to a user's total budget, or if information about a user's total budget is not available, the first value may be recommended to the user. For example, the optimization system may receive a user input of a first value of 300 GRPs to reach unique household viewers during the television show "Dance Moms". The optimization system may determine that when 300 GRPs are used to reach unique household viewers during the television show "Dance Moms," each additional GRP results in 30 new viewers. The optimization system may also determine that the rate of 30 new viewers per additional GRP is more than a threshold rate of 25 new viewers per additional GRP, and hence recommend a value of 300 GRPs to the user.

In some embodiments, if a user's total budget is greater than the first value, the optimization system may recommend a value different from the first value to the user. For example, the optimization system may receive a user input of a first value of 300 GRPs to reach unique household viewers during the television show "Dance Moms". The optimization system may also receive user input that the user's total budget is 500 GRPs. The optimization system may determine that when 300 GRPs are used to reach unique household viewers during the television show "Dance Moms," each additional GRP results in 30 new viewers. The optimization system may also determine that the rate of 30 new viewers per additional GRP is more than a threshold rate of 25 new viewers per additional GRP. The optimization system may determine that 350 GRPs could be used to reach unique household viewers during "Dance Moms" without exceeding the threshold rate or the user's total budget of 500 GRPs. Hence, the optimization system may recommend a value of 350 GRPs to the user.

In some embodiments, the optimization system may recommend a value to a user by displaying the value on display 312 or generating an audio clip of the value to be output through speakers 314. The optimization system may also send a representation of the value to user devices such as user television equipment 402, user computer equipment 404, or wireless user communication device 406.

At step 516, control circuitry 304 will execute a subroutine to determine a second rate on the conditions in 508 not being satisfied. After the subroutine is executed, the process may proceed to 518 where it is determined if the second rate is greater than or equal to the threshold rate, or if further iterations are needed.

In some embodiments, the optimization system may determine a second rate for the first media asset by determining a second rate associated with a second value. For example, the optimization system may receive a user input of a first value of 300 GRPs to reach unique household viewers during the television show "Dance Moms". The optimization system may determine that when 300 GRPs are used to reach unique household viewers during the television show "Dance Moms," each additional GRP results in 30 new viewers. The optimization system may also determine that the rate of 30 new viewers per additional GRP is less than a threshold rate of 50 new viewers per additional GRP. The optimization system may arrive at step 516 and determine a second rate for "Dance Moms". The optimization system may determine that a second value of 200 GRPs corresponds to a second rate of 50 new viewers per additional GRP.

In some embodiments, the optimization system may determine a second rate for a second media asset. For example, the optimization system may determine that a value of 300 GRPs corresponds to 30 new viewers per additional GRP for the television show "Dance Moms" but corresponds to 50 new viewers per additional GRP for the television show "Dancing with the Stars". In some embodiments, the optimization system may determine rates for several media assets for a given value, and choose the highest rate as the second rate.

At step 518, control circuitry 304 will check if the value of the second rate is greater than or equal to the value of the threshold rate. If the second rate is greater than or equal to the threshold rate, control circuitry 304 will proceed to step 520.

At step 520, control circuitry 304 will execute a subroutine to recommend a second value corresponding to the second rate to the user. For example, the optimization system may determine that when 300 GRPs are used to reach unique household viewers during the television show "Dance Moms," each additional GRP results in 30 new viewers, and when 200 GRPs are used to reach unique household viewers during the television show "Dance Moms", each additional GRP results in 50 new viewers. The optimization system may compare both rates to a threshold value of 40 new viewers per additional GRP, and recommend a value of 200 GRPs to the user. In some embodiments, if the second rate corresponds to a second media asset, the optimization system may also recommend the second media asset to the user.

It is contemplated that the descriptions of FIG. 5 may be used with any other embodiment of this disclosure. In addition, the descriptions described in relation to the process of FIG. 5 may be done in alternative orders or in parallel to further the purposes of this disclosure. For example, conditional statements and logical evaluations, such as those at 508, may be performed in any order or in parallel or simultaneously to reduce lag or increase the speed of the system or method. As a further example, in some embodiments several instances of received user input values may be evaluated in parallel, using multiple logical processor threads, or the process may be enhanced by incorporating branch prediction. Furthermore, it should be noted that the process of FIG. 5 may be implemented on a combination of appropriately configured software and hardware, and that any of the devices or equipment discussed in relation to FIGS. 3-4 could be used to implement one or more portions of the process.

The pseudocode in FIG. 6 describes a process to process user input of a first value of an amount of a resource in accordance with some embodiments of the disclosure. It will be evident to one skilled in the art that the process described by the pseudocode in FIG. 6 may be implemented in any number of programming languages and a variety of different hardware, and that the style and format should not be construed as limiting, but rather a general template of the steps and procedures that would be consistent with code used to implement some embodiments of this disclosure.

At line 601, the optimization system may run a subroutine to initialize variables and prepare the optimization system, which begins on line 605. For example, in some embodiments control circuitry 304 may copy instructions from non-transitory storage medium (e.g., storage device 308) into RAM or into the cache for processing circuitry 306 during the initialization stage. Additionally, in some embodiments the value of the threshold rate being used for comparison may be retrieved, set, and stored at 601.

In some embodiments, the initialization subroutine may include receiving user inputs about a resource type to be used during optimization (e.g., a currency, GRPs, time, or labor value), a total budget value for the optimization, an intended audience or demographic for the audience (e.g., an age bracket, income bracket, gender, or location), a metric to calculate unique household viewers reached (e.g., reach 3+, reach 5+), media assets during which household viewers should be reached (e.g., media assets on a specific channel, media assets broadcast during a certain time period, media assets having a certain attribute), a threshold rate to be used during optimization, or raw data indicating amounts of a resource used and corresponding numbers of unique household viewers reached. In some embodiments, the optimization system may prompt the user for the above inputs. In some embodiments, the optimization system may require the user to provide certain inputs before continuing to line 607.

At line 605, control circuitry 304 may receive a user input of a first value corresponding to a first amount of a resource. For example, the optimization system may receive a user input of a value "100," which may indicate an amount of 100 dollars. In some embodiments, the input may be received through user input interface 310.

At line 607, control circuitry 304 will store the value of a first rate determined using the first value into a temporary variable "A." In some embodiments, the value of the first rate will be stored as part of a larger data structure or class, and the value of the first rate may be obtained through appropriate accessor methods. In some embodiments, the value of the first rate may be converted from a string or other non-numeric data type into a numeric data type by means of an appropriate hashing process. In some embodiments, the first rate may be encoded as a primitive data structure, and rather than using a temporary variable, the first rate may be directly used in the comparisons at lines 609 and 611.

At line 608, control circuitry 304 will store the value of a threshold rate into a temporary variable "B." Similar to the first rate, in some embodiments the value of the threshold rate will be stored as part of a larger data structure or class, and the value of the threshold rate may be obtained through accessor methods. In some embodiments, the threshold rate may be converted from a string or other non-numeric data type into a numeric data type by means of an appropriate hashing process, or the threshold rate may be a primitive data structure, and may be directly used in the comparisons at lines 609 and 611.

At line 609, control circuitry 304 compares the value of A to the value of B to see if the value of A is greater than or equal to the value of B. In some embodiments, control circuitry 304 may call another function to perform this comparison.

At line 610, control circuitry 304 will execute a subroutine to recommend the first value to the user as described in relation to step 510 if the condition in line 609 is satisfied. In some embodiments, this may be achieved by processing circuitry 306 sending the appropriate signals to display 312 and speakers 314.

At line 611, control circuitry 304 will compare the value of A and B to determine if A is less than B. In some embodiments, this comparison will only be done if A is not essentially equivalent to B and the comparison in line 609 evaluates to FALSE.

At line 612, control circuitry 304 will execute a subroutine to determine a second rate using as described in step 516 if the condition in line 611 is satisfied.

At line 613, control circuitry 304 will store the value of a second rate determined using a new value of amount of resources into a temporary variable "C."

At line 614, control circuitry 304 may iterate through the various values of C, as described in relation to steps 516 and 518. As long as C is not greater than or equal to B, the loop will continue executing and more values of C are available. If only a single value of C is available, the loop will only execute once. This loop may be implemented in multiple fashions depending on the choice of hardware and software language used to implement the process of FIG. 6; for example, this may be implemented as part of a "for" or "while" loop.

At line 615, control circuitry 304 will execute a subroutine determine a new value of a second rate determined using a new value of amount of resources, and store the new value of the second rate into the temporary variable "C."

At line 616, control circuitry 304 may recommend a second value to the user as described in step 520. The second value may correspond to the second rate determined in lines 613 to 615.

At line 618, control circuitry 304 may run a termination subroutine after the process has performed its function. For example, in some embodiments control circuitry 304 may destruct variables, perform garbage collection, free memory or clear the cache of processing circuitry 306.

It will be evident to one skilled in the art that the process described by the pseudocode in FIG. 6 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments break conditions may be placed after lines 610 and 612 to speed operation, or the conditional statements may be replaced with a case-switch. In some embodiments, rather than iterating over all instances of C at line 614, in some embodiments the code may be rewritten so control circuitry 304 is instructed to evaluate multiple instances of C simultaneously on a plurality of processors or processor threads, lowering the number of iterations needed and potentially speeding up computation time.

Figure 7:
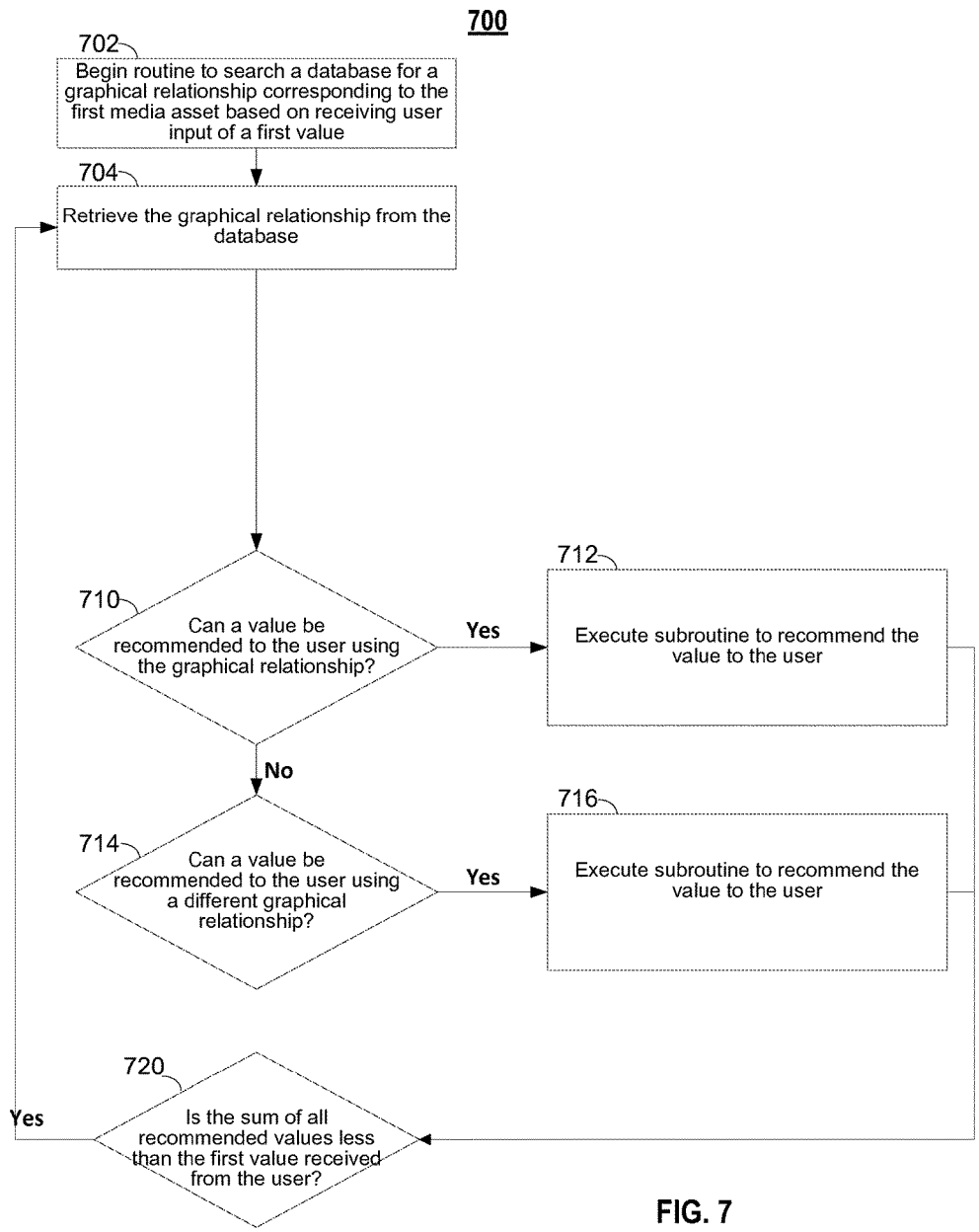
FIG. 7 is a flowchart of an illustrative process for using a database to recommend a second value to the user in accordance with some embodiments of the disclosure.

FIGS. 7 and 8 present a process for control circuitry (e.g., control circuitry 304) to recommend a second value to the user using a database containing graphical relationships indicating amounts of resources used and corresponding numbers of unique household viewers reached in accordance with some embodiments of the disclosure. The graphical relationships stored in the database may be similar to those shown in FIGS. 9 and 10. Similar to the processes described by FIGS. 5 and 6, in some embodiments this process may be encoded on to non-transitory storage medium (e.g., storage device 308) as a set of instructions to be decoded and executed by processing circuitry (e.g., processing circuitry 306). Processing circuitry may in turn provide instructions to other sub-circuits contained within control circuitry 304, such as the tuning, video generating, encoding, decoding, encrypting, decrypting, scaling, analog/digital conversion circuitry, and the like.

The flowchart in FIG. 7 describes a process for control circuitry (e.g., control circuitry 304) to search a database and recommend a second value to the user in accordance with some embodiments of the disclosure.

At step 702, the process to search a database and recommend a second value to the user will begin based on receiving a user input of a first value corresponding to a first amount of a resource to be used to reach unique household viewers during a first media asset. In some embodiments, this may be done either directly or indirectly in response to a user action or input (e.g., from signals received by control circuitry 304 or user input interface 310.)

Figure 9:
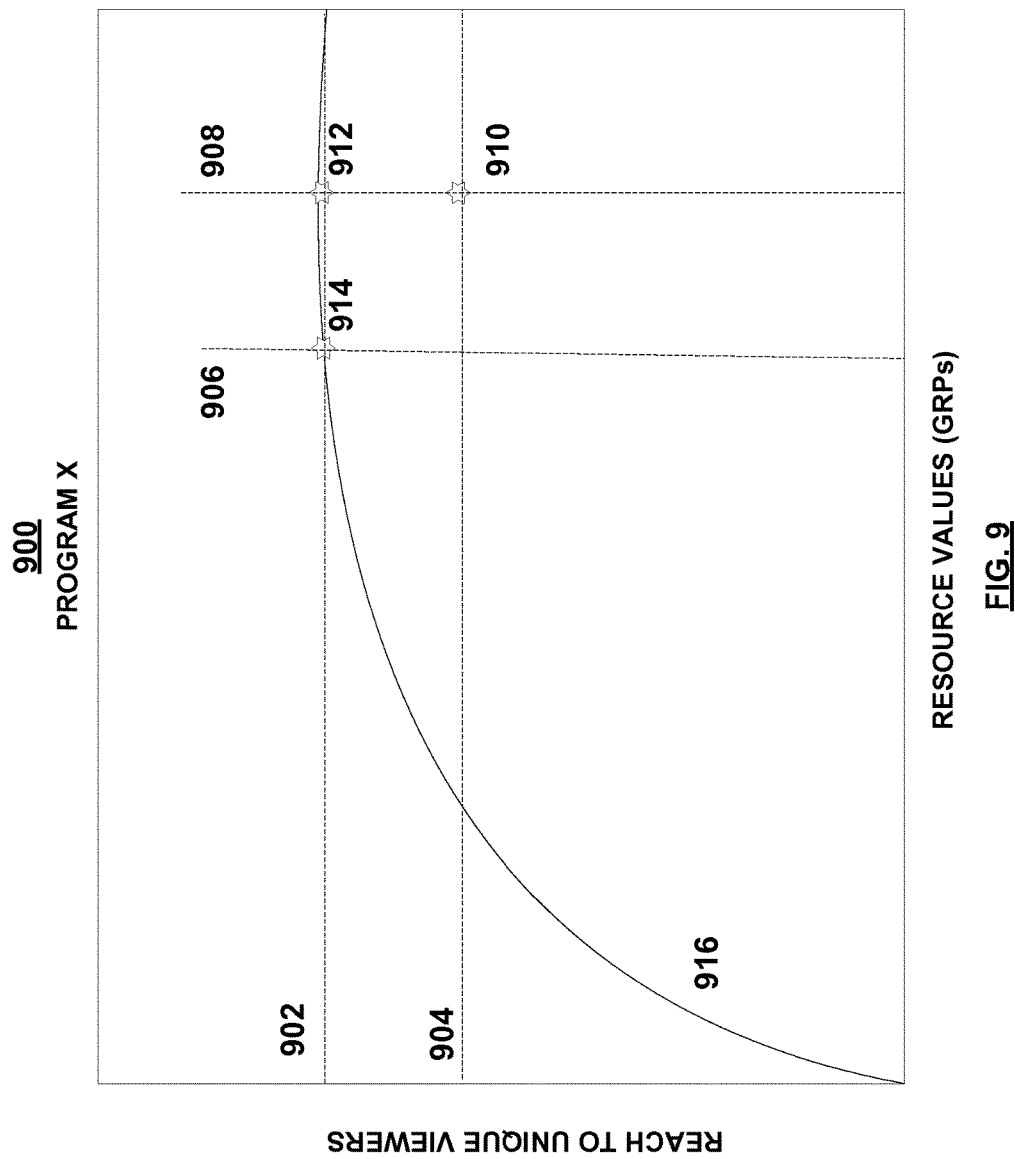
FIG. 9 is an illustrative graphical relationship indicating amounts of a resource used and corresponding numbers of unique household viewers reached, in accordance with some embodiment of the disclosure.
Figure 10:
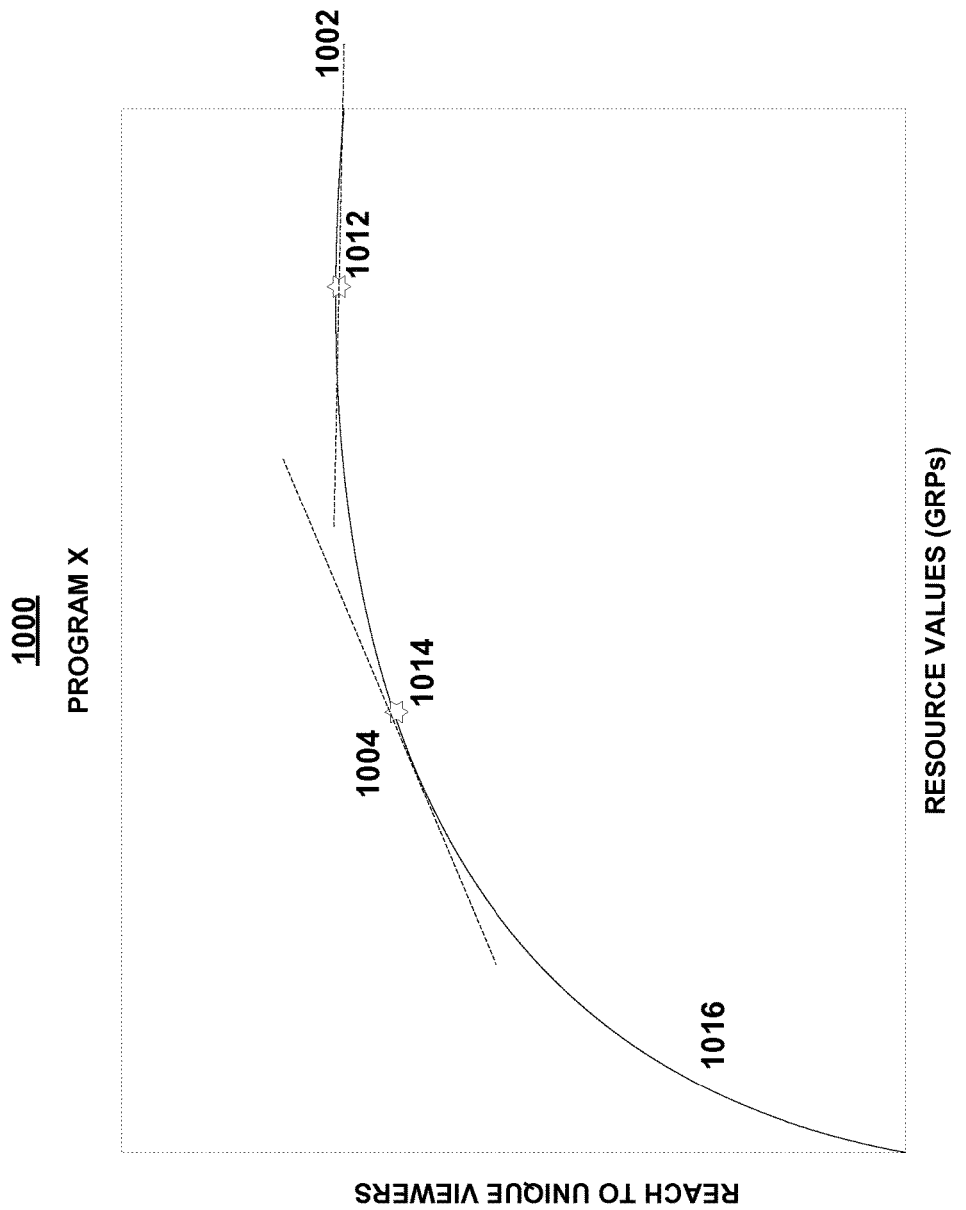
FIG. 10 is an illustrative graphical relationship indicating amounts of a resource used and corresponding numbers of unique household viewers along with rates associated with different resource values, in accordance with some embodiments of the disclosure.

At step 704, control circuitry 304 proceeds to retrieve the graphical relationship from a database listing relationships between amounts of the resource used and unique household viewers reached for a plurality of media assets. In some embodiments, the optimization system may index the database using an identifier of the first media asset to find a corresponding graphical relationship. In some embodiments, the optimization system may determine that a graphical relationship corresponding to the first media asset is unavailable, and instead identify an attribute of the first media asset and retrieve a graphical relationship of a second media asset with the same attribute. In some embodiments, the graphical relationship may comprise a plurality of numerical values grouped in pairs. In some embodiments, the graphical relationship may comprise a graph as shown in FIGS. 9 and 10. In some embodiments, control circuitry 304 may retrieve a single primitive data structure that represents the graphical relationship. In some embodiments, control circuitry 304 may retrieve the value from a larger class or data structure.

Control circuitry 304 may search the database tables for entries matching the first media asset. In some embodiments, this may be done by comparing an identifier, for example, a string or integer representing the first media asset, which matches the types of identifiers used inside the database. In some embodiments, control circuitry 304 may submit a general query to the database for table entries matching the first media asset, and control circuitry 304 may receive a list of indices or a data structure containing a portion of the database contents. In some embodiments, the database may implement a junction table that in turn cross-references entries from other databases. In this case, control circuitry 304 may retrieve indices from a first database that in turn can be used to retrieve information from a second database. Although we may describe control circuitry 304 interacting with a single database for purposes of clarity, it is understood that the process of FIG. 7 may be implemented using multiple independent or cross-referenced databases. In some embodiments, some of the multiple databases may be remote databases accessed using communications network 414.

At step 710, control circuitry 304 may determine if a value can be recommended to the user using the graphical relationship. In some embodiments, a value may be recommended to the user if the first rate corresponding to the user input first value is greater than or equal to the threshold rate. For example, the optimization system may receive a relationship indicating that the first rate corresponding to a user input value of 50 GRPs is 10 new viewers per additional GRP spent. The optimization system may determine the first rate is greater than a threshold rate of 8 new viewers per additional GRP spent. The optimization system may recommend the first value of 50 GRPs to the user.

In some embodiments, a value may be recommended to the user if a second value can be recommended using the same graphical relationship. For example, the optimization system may receive a relationship indicating that the first rate corresponding to a user input value of 50 GRPs is 10 new viewers per additional GRP spent. The optimization system may determine the first rate is less than a threshold rate of 12 new viewers per additional GRP spent. The optimization system may then determine that a second value of 40 GRPs corresponds to a second rate of 14 new viewers per additional GRP using the same graphical relationship. The optimization system may determine the second rate is greater than the threshold rate, and hence may recommend the second value of 40 GRPs to the user. If control circuitry 304 identifies that a value can be recommended to the user using the graphical relationship, the process proceeds to step 712, otherwise the process proceeds to step 714.

At step 712, control circuitry 304 will execute a subroutine to recommend the first value to the user. The optimization system may do this as described in relation to step 510.

At step 714, control circuitry 304 may determine if there are database entries similar to the first media asset. For example, in some embodiments, if the first media asset is as associated with multiple attributes, control circuitry 304 may perform additional database queries for media assets with similar attributes. In some embodiments, control circuitry 304 may also determine if the original query included a commonly misspelled word, and will submit a query with the correct spelling instead. In another example, the first media asset may correspond to an integer identifier; control circuitry 304 may perform additional queries for other integer identifiers for other media assets within a certain range. In some embodiments, control circuitry 304 may retrieve database entries similar to the first media asset without requiring further queries. In some embodiments, the optimization system may ask a user to select a second media asset. If control circuitry 304 identifies that there is a second media asset similar to the first media asset, the optimization retrieves a second graphical relationship for second media asset as described in relation to step 704.

The optimization system then determines if a value of resources in the second graphical representation can be recommended to the user, as described in relation to step 710. For example, the optimization system may determine no rate determined using a graphical representation for a television show "Dance Moms" is greater than or equal to a threshold value. The optimization system may then retrieve a graphical representation for a related television show "Dancing with the Stars" and determine that a rate from this graphical representation is greater than the threshold rate. The optimization system may hence determine a value corresponding to the rate determined for the television show "Dancing with the Stars" can be recommended to the user. If a value from the second graphical representation can be used, the process proceeds to step 716; otherwise the process may end without being able to make a recommendation.

At step 716, control circuitry 304 will execute a subroutine to recommend the value from step 714 to the user. The control circuitry may do this in a manner similar to step 520. Afterwards, the process may proceed to step 720.

At step 720, control circuitry 304 will determine if the sum of all recommended values thus far is less than the first value received from the user to determine if further iterations are needed. If the sum of all recommended values is less than the first value received from the user, the optimization system may determine further values can be recommended to the user without exceeding the user's desired value for reaching unique household viewers. The optimization system may then perform a further iteration of the process by recommending a value associated with a second media asset. The second media asset may have similar attributes to the first media asset. If further iterations are needed the process will loop back to step 704 where control circuitry 304 will retrieve a graphical relationship associated with a second media asset. If no further iterations are needed the process will end.

It is contemplated that the descriptions of FIG. 7 may be used with any other embodiment of this disclosure. In addition, the descriptions described in relation to the process of FIG. 7 may be done in alternative orders or in parallel to further the purposes of this disclosure. For example, control circuitry 304 may submit multiple queries to the database in parallel, or it may submit multiple queries to a plurality of similar databases in order to reduce lag and speed the execution of the process. In some embodiments, step 710 and step 714 may be performed in parallel by control circuitry 304. Furthermore, it should be noted that the process of FIG. 7 may be implemented on a combination of appropriately configured software and hardware, and that any of the devices or equipment discussed in relation to FIGS. 3-4 could be used to implement one or more portions of the process.

The pseudocode in FIG. 8 describes a process to determine a second value using a graphical relationship in accordance with some embodiments of the disclosure. It will be evident to one skilled in the art that the process described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, the process may run a subroutine to initialize variables as described in relation to line 601. The initialization routine may also include receiving a user input of a value as described in line 605.

At line 805, control circuitry 304 may receive instances of identifiers of media assets. In some embodiments, the media assets may be identified based on user input. For example, the optimization system may receive user input that unique household viewers should be reached during a television show "Dance Moms" or during shows in the genre "Reality Television". The optimization system may then determine identifiers for shows corresponding to the user input. The identifiers may be alpha-numeric strings or integer values wherein each value is unique to a media asset or a group of media assets. In some embodiments, the optimization system may receive a user input of a single media asset, and determine identifiers for related media assets. For example, the optimization system may receive user input that unique household viewers should be reached during a television show "Dance Moms". The optimization system may determine that "Dancing with the Stars" is a similar television show as they both share the attribute of belonging in the genre "Reality Television" and hence include identifiers of both shows in the set of media assets determined in line 805.

At line 806, control circuitry 304 may iterate through the various media assets; if only a single instance is available, the loop will only execute once. This loop may be implemented in multiple fashions depending on the choice of hardware and software language used to implement the process of FIG. 8; for example, this may be implemented as part of a "for" or "while" loop, in some programming languages. In some embodiments, it may be convenient to store the instances of the identifiers of the media assets in a single class or encapsulated data structure that will perform the loop as part of an internal method.

At line 807, control circuitry 304 may query a database for a graphical relationship corresponding to the current media asset. Depending on how the database is implemented and how the graphical relationships are stored, an intermittent step may be required to convert a graphical relationship from a form consistent with the database to a form consistent with the optimization system. In some embodiments, the media asset identifier may be encoded into a string or an integer using an appropriate hashing process prior to being transmitted to the database by control circuitry 304 as part of a query. In some embodiments, the media asset identifier may be encoded as a primitive data structure, and control circuitry 304 may submit media asset identifier as a query to the database directly. After querying the database, control circuitry 304 may receive a graphical relationship matching the media asset identifier. In some embodiments, control circuitry 304 may receive these entries in the form of a data-structure, a set of indices of the database, or a set of indices of another cross-referenced database.

At line 809, control circuitry 304 may determine the value of a second rate using the graphical relationship. This may be done as described in relation to step 516. After determining a second rate, the process will proceed to line 811.

At line 811, control circuitry 304 may determine if there the second rate is less than the threshold rate. In some embodiments, the second rate and the threshold rate may be stored in different data structures. Control circuitry 304 may call a function to perform a fuzzy comparison by comparing specific fields of the class or by performing approximate string matching on the second rate and the threshold rate. In some embodiments, the optimization system may call another function to determine if the second rate is less than the threshold rate by comparing their integer or real number values. If the condition in line 811 is true, then the process proceeds to line 812.

At line 812, control circuitry 304 will execute a subroutine to repeat the loop of line 806 using a different media asset, as an appropriate value could not be found using the current media asset.

At line 813, control circuitry 304 will determine that the condition in line 811 was not met, and hence the process will proceed to line 814.

At line 814, control circuitry 304 will execute a subroutine to recommend the second value to the user as described in relation to step 520. Afterwards, the process may proceed to line 814.

At line 815, control circuitry 304 will perform a comparison to determine if the sum of all recommended values thus far in iterations of the loop in line 806 exceed a user input first value. If the sum of all recommended values does not exceed the first value, further values can be recommended to the user as a user-determined maximum has not yet been exceeded. This may correspond to step 720. If the condition in line 815 is true, the process may proceed to file 816. Otherwise, the process may proceed to line 818.

At line 816, control circuitry 304 may execute a subroutine to repeat the loop using a different media asset as described in line 812. If all media assets in the media assets determined in line 805 have been iterated through by the loop in line 806, the process may exit the loop. Afterwards, the process may proceed to the termination subroutine at line 817.

At line 817, control circuitry 304 may execute a termination subroutine after the process has performed its function of recommending a second value, and recommending additional values if the sum of the recommended values is less than a user input first value. For example, in some embodiments control circuitry 304 may destruct variables, perform garbage collection, free memory or clear the cache of processing circuitry 306.

It will be evident to one skilled in the art that the process described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. It is also understood that although we may describe control circuitry 304 interacting with a single database, this is only a single embodiment described for illustrative purposes, and the process of FIG. 8. may be implemented using multiple independent or cross-referenced databases. For example, a database stored locally (e.g., on storage 308) may index or cross-reference a database stored remotely (e.g., media guidance data source 418), which may be accessible through any number of communication channels (e.g., communications network 414). In some embodiments, this may allow control circuitry 304 to utilize a look-up table or database front-end efficiently stored on a small local drive to access a larger database stored on a remote server on demand.

FIG. 9 is an illustrative graphical relationship (graph) 900 indicating amounts of a resource used and corresponding numbers of unique household viewers reached that may be retrieved from a database by the optimization system using control circuitry 304, in accordance with some embodiments of the disclosure. Amounts of the resource used are shown on the x-axis. Reach values corresponding to a proportion of unique members of a target audience reached are shown on the y-axis. Although the resource is measured in terms of GRP in graph 900, any other resource measurement may be used. In some embodiments, graph 900 may correspond to "Program X", which may be any media asset as described above. In some embodiments, graph 900 may be displayed to the user on display 312.

In some embodiments, the optimization system may create graph 900 using user input data. For example, the optimization system may receive user data indicating resource values used in past campaigns and corresponding numbers of unique viewers reached, and use that to construct graph 900. The optimization system may then store graph 900 in the database by associating it with "Program X". In some embodiments, a user, such as a campaign manager, may be able to modify graph 900 using user input interface 310. In some embodiments, reach curve 916 may be modeled using mathematical approximations and heuristics for the flow of information to different audience members. In some embodiments, reach curve 916 may already be predetermined and stored to be retrieved from storage circuitry 308 when needed.

The optimization system may receive data from media guidance data source 418 such as the number of viewers who access a certain media asset. The optimization system may process the received data to generate reach curve 916. Reach curve 916 may describe the reach associated with campaigns associated with different values of GRP. For example, a campaign with a low value of GRP may be able to reach fewer unique audience members, and hence have a lower reach. In another example, a campaign with a high value of GRP may reach several unique audience members, and hence have a higher reach. In another example, a campaign with very high GRP may have a similar reach as a campaign with a lower value of GRP because the campaign with a very high value of GRP may reach the same audience members multiple times and hence not reach many more unique audience members than the campaign with the lower value of GRP.

Reach curve 916 may describe the best possible reach that can be achieved for any given value of GRP. Campaign managers may desire to ensure their campaign has a reach value on reach curve 916 for their given value of GRP.

Point 910 may be a point in graph 900 indicating the average or initial performance of a campaign without the optimization system. For example, point 910 may indicate the performance of a campaign set up by a campaign manager using traditional methods. Point 910 indicates that the reach has not been maximized for the value of GRP since point 910 is not lying on reach curve 916.

The optimization system may compare reach curve 916 and point 910 to determine that a higher reach value can be achieved. The optimization system may use control circuitry 304 to generate point 912. Point 912 has the same value of GRP as point 910, but the reach has been increased from level 904 to level 902. Hence, a campaign can reach a higher proportion of the audience for the same value of GRP. The optimization system may achieve this increase in reach without a change in value of GRP by more efficiently allocating the GRP.

The optimization system may also determine that a reach value can be maintained with a lower value of GRP. For example, the optimization system may compare point 912 with reach curve 916 using control circuitry 914. The optimization system may determine that reach level 904 can stay constant as the value of GRP is decreased from level 908 to level 906. This may be because increasing GRP eventually results in diminishing returns, so that fewer and fewer unique audience members are reached for each consecutive increase in the value of GRP. Hence, the reach of a campaign may stay substantially unchanged for some ranges of the value of GRP. Lowering the value of GRP may lead to savings in resources such as cost, time, and effort for a campaign manager. In some embodiments, the resources saved can be used to create a different campaign for a different media asset.

In some embodiments, the optimization system may decide to reduce the value of GRP even if doing so results in a slight decrease in reach. The optimization system may determine that doing so will result in the best possible use of GRP. For example, the optimization system may compare point 912 with point 914 to determine that point 914 has a slightly lower reach than point 912; however, point 914 has a significantly lower value of GRP than point 912. The optimization system may determine the reduction in GRP is significant enough to outweigh the effect of the reduction in reach.

In some embodiments, the optimization system may take into account campaign manager preferences when determining if a decrease in value of GRP is significant enough to outweigh the effect of decrease in reach. For example, a campaign manager may input preferences into the optimization system that a decrease in reach of up to 5% is acceptable if it results in a decrease in value of GRP of more than 15%. In another example, a campaign manager may input preferences into the optimization system describing the minimum or maximum desired reach, such as "at least 30% of available reach" or "at most 95% of available reach". The optimization system may take these preferences into account when determining point 914. In some embodiments, the optimization system may determine a maximum reach per allocated GRP to determine if a decrease in value of GRP is significant enough to outweigh the effect of decrease in reach. In some embodiments, the optimization system may determine if a decrease in value of GRP is significant by comparing a rate associated with a GRP value at point 912 to a threshold rate, as described in relation to FIG. 10.

FIG. 10 is an illustrative graphical relationship (graph) 1000 indicating amounts of a resource used and corresponding numbers of unique household viewers along with rates associated with different resource values, in accordance with some embodiments of the disclosure. Reach curve 1016 is similar to reach curve 916. The x-axis and y-axis of graph 1000 are similar to the x-axis and y-axis of graph 900.

Point 1012 may be a point on reach curve 1016 corresponding to a value of GRPs received from the user by the optimization system. The optimization system may determine rate 1002 associated with point 1012 by calculating a slope of reach curve 1016 at point 1012. The optimization system may calculate rate 1002 by determining the number of viewers to be gained for each additional unit of GRP, or by calculating the number of viewers gained for each unit of GRP spent so far. The optimization system may use reach values instead of a number of unique viewers when calculating rate 1002.

In some embodiments, the slope may be calculated by taking a derivative of reach curve 1016 at point 1012. The derivative may be calculated by using the following equation:

$$\text{slope} = \frac{dy}{dx}(x_0)$$

Wherein:
dy/dx is the derivative of reach curve 1016; and
$x_0$ is a resource value at point 1012.

In some embodiments, the slope may be estimated for a point using its x-axis and y-axis values. For example, the slope for point 1012 may be estimated by dividing its y-axis value (i.e., its audience reach) by its x-axis value (i.e., its resource value).

Rate 1004 may be a threshold rate. The optimization system may retrieve a threshold rate based on an attribute of "Program X" from a database containing threshold rates associated with different attributes. In some embodiments, the optimization system may receive user input indicating the threshold rate. In some embodiments, the optimization system may determine a threshold rate based on user criteria about determining if a decrease in value of GRP is significant enough to outweigh the effect of decrease in reach as described above. In some embodiments, the optimization system may identify a "knee point" of reach curve 1016 to identify the threshold rate.

The optimization system may compare rates 1002 and 1004 to determine that rate 1002 does not equal or exceed rate 1004. The optimization system may recommend a second value of GRPs to the user different from the value of GRPs associated with point 1012 in response to this determination. The second value of GRPs may be associated with a rate that equals or exceeds the threshold rate. For example, the optimization system may recommend a value of GRPs associated with point 1014 to the user. In some embodiments, the optimization system may recommend a second value associated with a different media asset to the user.

Figure 11:
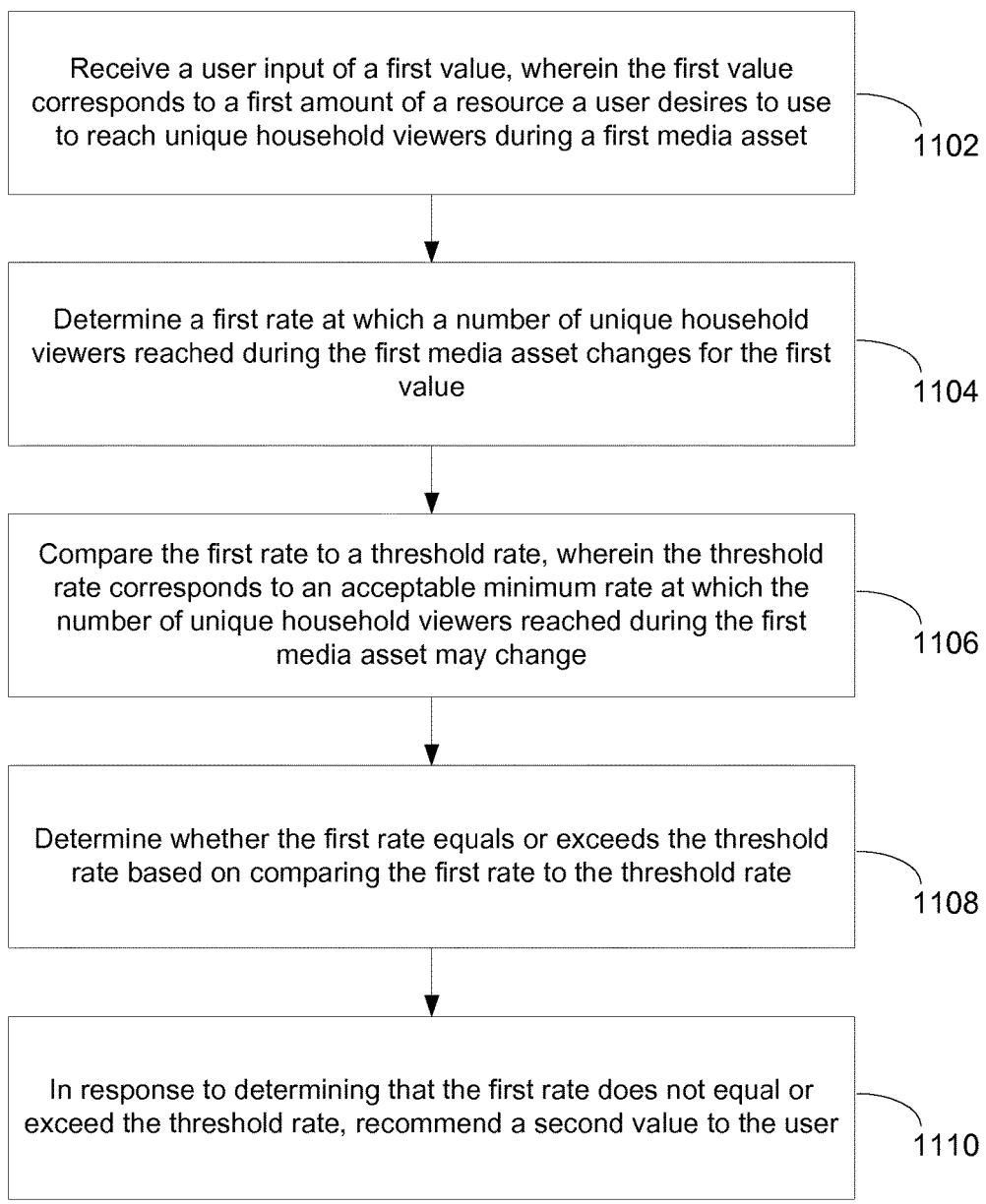
FIG. 11 is a flowchart of an illustrative process for recommending amounts of resources for use in reaching viewers during a media asset, in accordance with some embodiments of the disclosure.

FIG. 11 shows an illustrative flowchart of process 1100 for recommending amounts of resources for use in reaching viewers during a media asset, in accordance with some embodiments of this invention. It should be noted that process 1100 or any step thereof could be performed on, or provided by, the optimization system on any of the devices shown in FIGS. 3-4. For example, process 1100 may be executed by processing circuitry 304 (FIG. 3) as instructed by processing circuitry implemented on user equipment 402, 404, and/or 406 (FIG. 4) in order to provide information to a user. In addition, one or more steps of process 1100 may be incorporated into or combined with one or more steps of any other process or embodiment.

At step 1102, the optimization system may receive a user input of a first value, wherein the first value corresponds to a first amount of a resource a user desires to use to reach unique household viewers during a first media asset. The user may input a value of any type of resource using user input interface 310. The user may measure a number of unique household viewers reached using a reach value as described above. The user may be a campaign manager. Although some examples below refer to advertisements, any other type of information may be distributed to an audience during a campaign without departing from the scope of this disclosure.

In some embodiments, the optimization system may receive additional information from the user. Each user input may be associated with a unique user identifier. The optimization system may store the user inputs in a database using storage circuitry 308, and later retrieve it by cross-referencing the user's unique identifier with the listings of user criteria in the database.

In some embodiments, other user inputs may include the user's preference for any specific demographics the advertisements should target. For example, the optimization system may receive, through user input interface 310, indications that the advertisements should target only certain audience members in a certain age range or income bracket.

In some embodiments, other user inputs may include a listing of media assets that the user wishes to target. The first media asset may be included in the listing of media assets. For example, the optimization system may receive a user indication that the advertisements should be placed in certain magazines, or be displayed through display 312 during certain television programs. In some embodiments, the optimization system may receive a priority associated with each media asset in the listing of media assets, wherein in the priority associated with each media asset may be a qualitative label of "High", "Medium", or "Low", or a quantitative label of a number indicating a ranking. The optimization system may use the priorities to identify a next highest priority media asset in the listing if a resource value cannot be recommended for the first media asset.

In some embodiments, other user inputs may include any special constraints the user wishes to adhere to. For example, the optimization system may receive a user indication that advertisements should only be displayed three times an hour during television programs, or they should always be spaced apart by 10 pages in a magazine.

In some embodiments, the first value may indicate a maximum value of GRP, or a preferred value of GRP. For example, the optimization system may receive a user indication that the value of GRP value should be under a certain limit, or close to a certain value. The user input may include a maximum or preferred value for any other type of resource as well. For example, the first value may indicate that the campaign should have a budget of less than $100, or use a value of GRP of at least 15. In some embodiments, the resource may be an available number of advertising instances appearing in the first media asset. For example, the resource may be 12 advertising slots available in a television show "Dance Moms".

In some embodiments, other user inputs may include a maximum or minimum reach goal. For example, the optimization system may receive a user indication that the reach of the allocated advertisements should be above 40% or less than 90%.

Process 1100 then proceeds to step 1104, when the optimization system determines a first rate at which a number of unique household viewers reached during the first media asset changes for the first value. In some embodiments, the optimization system may determine the first rate using graph 900 as described in relation to FIGS. 9 and 10. The optimization system may compare the first media asset with a database listing relationships between amounts of the resource used and unique household viewers reached for a plurality of media assets. The optimization system may then retrieve a graphical relationship associated with the first media asset. For example, the optimization system may receive a user input identifying a television show "Dance Moms". The optimization system may compare an identifier of the television show "Dance Moms" to the database listing graphical relationships for several television shows to identify the graphical relationship associated with "Dance Moms". This graphical relationship may be retrieved using storage circuitry 308.

In some embodiments, the optimization system may retrieve a graphical relationship by comparing an attribute of the first media asset to the database if a graphical relationship corresponding to the first media asset cannot be identified. For example, the optimization system may receive a user input identifying a television show "Dance Moms" and determine that no graphical relationship corresponding to "Dance Moms" exists in the database. The optimization system may determine that "Dance Moms" has an attribute of "Reality Television" using media guidance data source 418, and compare this attribute to the database. The optimization system may retrieve either a generic graphical relationship associated with the attribute, or a graphical relationship of a second media asset with the same attribute. In some embodiments, the attribute may include a genre, a title, or a broadcast time. Attributes may also include actors, directors, producers, parental control ratings, and any such data available from media guidance data source 418.

In some embodiments, the optimization system may receive user input about amounts of resources used and corresponding unique household viewers reached. The optimization system may use this information to generate a graph 900 or 1000, and then store this graph associated with the first media asset in a database of graphical relationships associated with different media assets using storage circuitry 308.

Process 1100 may proceed to step 1106, when the optimization system compares the first rate to a threshold rate, wherein the threshold rate corresponds to an acceptable minimum rate at which the number of unique household viewers reached during the first media asset may change. In some embodiments, the optimization system may calculate the threshold rate. For example, the optimization system may calculate a threshold rate associated with a "knee point" of a graph for the first media asset. In some embodiments, the optimization system may receive a user input of a threshold rate. In some embodiments, the threshold rate may take into account any user preferences and inputs received in step 1102. For example, the optimization system may receive a user input to only target a demographic in the age range of 18-49, and determine a threshold rate using a graph created using only that demographic as the audience.

In some embodiments, the optimization system may select the threshold rate by determining an attribute of the first media asset and comparing the attribute of the first media asset with a database listing threshold rates corresponding to the plurality of attributes to identify the threshold rate. For example, the optimization system may determine that an attribute of the television show "Project Runway" is "Fashion". The optimization system may compare this attribute with a database to identify a threshold rate associated with the attribute "Fashion".

Process 1100 proceeds to step 1108, when the optimization system determines whether the first rate equals or exceeds the threshold rate based on comparing the first rate to the threshold rate as described in relation to step 1106. For example, the optimization system may determine that a user input value of 300 GRPs corresponds to a first rate of 10 new viewers per additional GRP for a television show "Dance Moms". The optimization system may compare this first rate to a threshold rate of 8 new viewers per additional GRP to determine that the first rate exceeds the threshold rate.

In some embodiments, the optimization system recommends the first value to the user if the first rate equals or exceeds the threshold rate. The optimization system may recommend a value to the user by storing it for future access by the user using storage circuitry 308, or by presenting it to the user using display 312 or speakers 314. In some embodiments, the optimization system may determine a third value that equals or exceeds the threshold rate, and results in a campaign with either a higher reach or lower resource value than the first value. The optimization system may recommend this third value to the user.

Process 1100 proceeds to step 1110, when the optimization system, in response to determining that the first rate does not equal or exceed the threshold rate, recommends a second value to the user. In some embodiments, the second value corresponds to a second amount of the resource the user desires to use to reach unique household viewers during a second media asset. The optimization system may identify a second media asset by searching a database for media assets with similar attributes to the first media asset, or by proceeding to a next media asset in a listing of user input media assets.

In some embodiments, the optimization system recommends the second value to the user by determining that a second rate associated with the second value equals or exceeds the threshold rate. For example, the optimization system may determine that a user input value of 300 GRPs corresponds to a first rate of 10 new viewers per additional GRP for a television show "Dance Moms". The optimization system may compare this first rate to a threshold rate of 12 new viewers per additional GRP to determine that the first rate does not equal or exceed the threshold rate. The optimization system may identify that the user provided a media asset listing in which a television show "Dancing with the Stars" has the highest associated priority. The optimization system may determine that a second rate of 14 new viewers per additional GRPs is associated with "Dancing with the Stars" for a value of 300 GRPs. The optimization system may determine that the second rate exceeds the threshold rate, and hence recommend the second value of 300 GRPs to the user. The optimization system may also recommend the second media asset (i.e., "Dancing with the Stars") to the user.

In some embodiments, the optimization system may recommend the second value to the user if the second value results in a more efficient campaign. For example, the optimization system may determine if the second amount is less than the first amount and if the second rate is greater than the first rate, and only recommend the second value if one or both of these conditions are true. The optimization system may also determine if the number of unique household viewers reached using the second value are greater than the number unique of unique household viewers reaching using the first value, and only recommend the second value if this condition is true.

In some embodiments, the optimization system may compare the second rate associated with the second media asset to the first rate associated with the first media asset. The optimization system may recommend the value and media asset associated with the rate that is determined to be greater. If both rates are equal, the value and media asset associated with either rate can be recommended. In some embodiments, the optimization system may determine if the recommended second value is less than the user input first value. If so, the optimization system may determine the difference between the two values, and recommend a third rate and third media asset associated with the third value. The third rate and media asset may be determined in the same manner as described in relation to the second rate and media asset.

Figure 12:
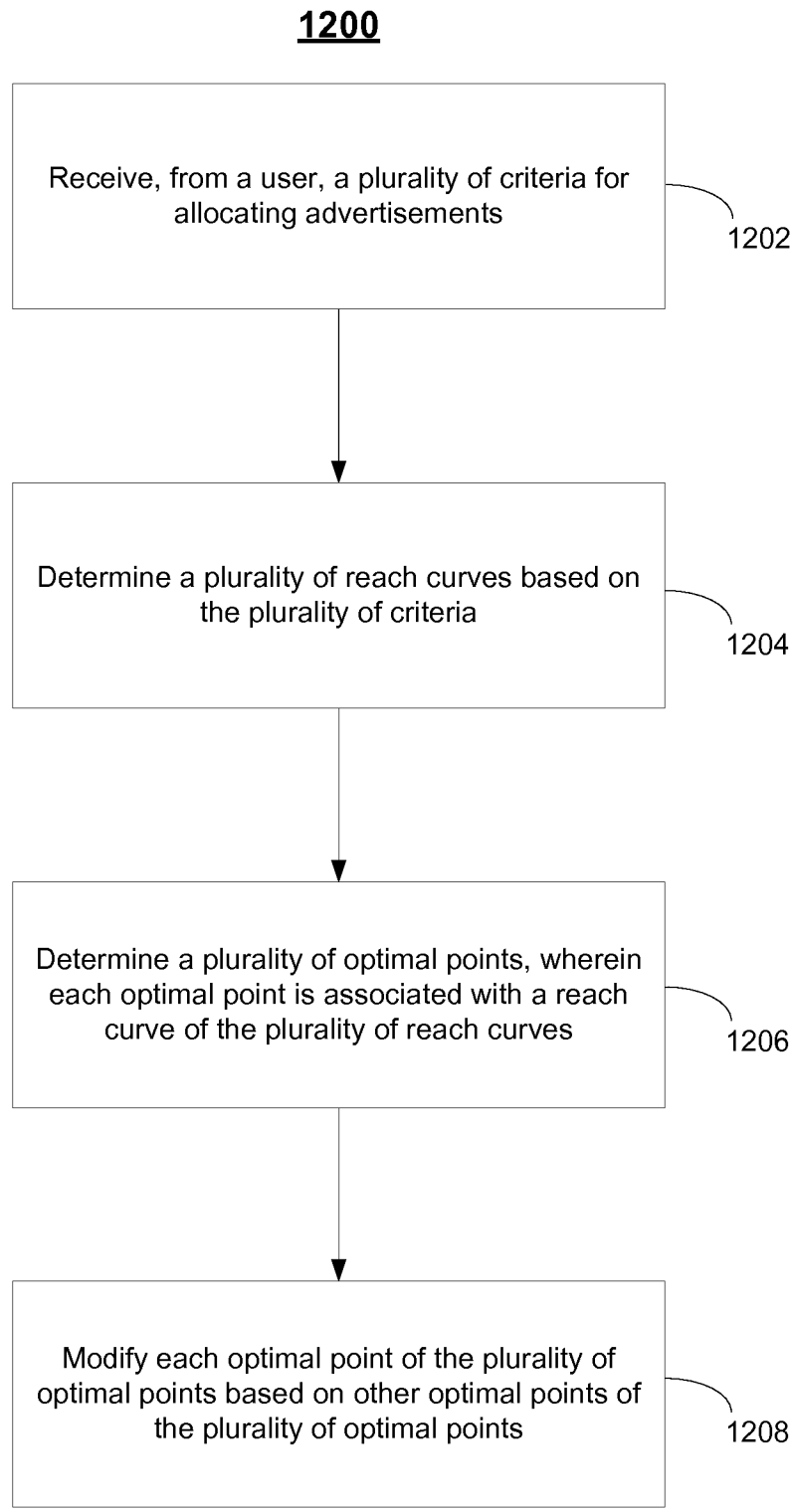
FIG. 12 shows an exemplary flowchart describing a process for allocating resources between multiple media assets, in accordance with some embodiments of the disclosure.

FIG. 12 shows an exemplary flowchart describing process 1200 for allocating resources between multiple media assets, in accordance with some embodiments of the disclosure. It should be noted that process 1200 or any step thereof could be performed on, or provided by, the optimization system on any of the devices shown in FIGS. 3-4. For example, process 1200 may be executed by processing circuitry 304 (FIG. 3) as instructed by processing circuitry implemented on user equipment 402, 404, and/or 406 (FIG. 4) in order to provide information to a user. In addition, one or more steps of process 1200 may be incorporated into or combined with one or more steps of any other process or embodiment.

Conventional systems may rely on user input defining an allocation of resources among media assets. Conventional systems may also try to obtain a maximum audience reach for a single media asset, to the detriment of reach values achieved for other media assets. Conventional systems may also consider resources used and audience reach achieved for each media asset individually. In contrast, the present optimization system may recommend an allocation of resources between multiple media assets to the user. The optimization system may also consider resources used and audience reach achieved for all media assets taken together, and optimizes for the combined reach of all media assets. This allows the present optimization system to more efficiently allocate resources for all media assets considered together, even if the resource allocation results in lower audience reaches than could otherwise be achieved for single media assets.

At step 1202, the optimization system may receive from a user a plurality of criteria for allocating advertisements. The criteria may be received as described in relation to step 1102.

Process 1200 proceeds to step 604, when the optimization system may determine a plurality of reach curves based on the plurality of criteria. Each reach curve may be associated with a different media asset. For example, the optimization system may receive a criterion that the user wishes to allocate advertisements between the television shows "Dance Moms" and "Dancing with the Stars". The optimization system may generate a graph as described in relation to FIGS. 9 and 10 for each of the television shows. The graphs for each show may be based on empirical data about viewership for each show retrieved by the optimization system from media guidance data source 418.

The optimization system may retrieve look-up tables from storage circuitry 308. The optimization system may cross-reference the criteria provided in step 1202 to the data in the look-up tables. In some embodiments, each criterion may be associated with its own look-up table. For example, the optimization system may receive user criteria that the user wants to allocate advertisements between the television shows "Dance Moms" and "Dancing with the Stars". The optimization system may retrieve a look-up table containing viewership data for different television shows and cross-reference the lookup table with the user-selected shows to identify the viewership data for "Dance Moms" and "Dancing with the Stars". The optimization system may also retrieve other information such as user demographics for each television show in a similar manner.

The optimization system may take into account all user criteria and all retrieved data associated with the user criteria to generate the graphs. For example, if the optimization system received a user criterion that the reach goal is 40%, the optimization system may generate graph 900 where reach curve 516 is above 40% for some values of GRP.

In some embodiments, the optimization system may retrieve graphs from a database as described in relation to step 1104.

Process 1200 proceeds to step 1206, when the optimization system determines a plurality of initial points, wherein each initial point is associated with a reach curve of the plurality of reach curves. Each initial point may describe the point where the highest reach can be achieved for the lowest GRPs. The optimization system may determine the initial points by computing a "knee point" of curve 916 using control circuitry 304. For example, the optimization system may determine that the initial point for advertising during the program "Dance Moms" occurs at 40% reach and a value of GRP of 60.

Process 1200 proceeds to step 1208, when the optimization system modifies each initial point of the plurality of initial points based on the other initial points of the plurality of initial points. The optimization system may modify the initial points located on each reach curve based on other reach curves calculated to ensure all reach curves are optimized together. For example, the optimization system may determine that the initial point for a reach curve for the television program "Dance Moms" is at 45% reach and a value of GRP of 50. The optimization system may also determine that the initial point for a reach curve for the television program "Dancing with the Stars" is at 30% reach and a value of GRP of 30. The optimization system may determine that the total reach for both programs combined with their current initial points would be 50%, with a value of GRP of 80. However, the optimization system may determine that the initial points for each program can be edited to result in a total reach of 48%, with a value of GRP of 70. This may involve combining the reach curves for both television shows to determine that it is possible to reach a similar number of unique audience members while significantly reducing the value of GRP. In some embodiments, the optimization system may combine the curves by retrieving or receiving empirical data associated with an advertisement campaign targeting both television shows together and using it to create a reach curve. The optimization system may determine that the decrease in GRP is significant enough to outweigh the effects of the decrease in reach. The optimization system may move the initial points on the individual reach curves associated with "Dance Moms" and "Dancing with the Stars" so that the combination of the two programs becomes optimized.

The optimization system may modify the user criteria received from the user in step 1202 and stored using storage circuitry 308. The optimization system may retrieve the user criteria by comparing the user's unique identifier to the listings of user criteria in the database. The optimization system may then modify the user criteria to indicate what user resources have already been allocated and what user criteria have been met. For example, the optimization system may retrieve user criteria indicating that an advertising campaign desired by the user can use a value of GRP of 100 and needs to have a reach of 50%. The optimization system may have created an optimal advertising campaign that uses a value of GRP of 60 and has a reach of 55%. The optimization system may modify the user criteria to indicate a value of GRP of 40 is remaining and that the reach goal has been met.

The optimization system may display the resulting reach curves and optimal points to the user through display 312. The optimization system may use communications network 414 to communicate with media guidance data source 418 to implement a campaign based on the resulting initial points.

In a non-limiting example, the optimization system may receive an advertisement campaign created by a campaign manager. This may correspond to step 1202 in process 1200. The advertisement campaign may allocate a value of GRP of 25 to the television show "Kim of Queens" and a value of GRP of 20 to the television show "Dance Moms". The advertisement campaign may have a reach 3+ (i.e., reach to unique audience members who watch an advertisement three or more times) for "Kim of Queens" of 40% and for "Dance Moms" of 20%.

The optimization system may not change the allocation of values of GRP but still optimize for reach. The original advertisement campaign may correspond to point 910 in graph 900, and this optimized advertisement campaign may correspond to point 912 in graph 900. The optimization system may determine reach curves for "Kim of Queens" and "Dance Moms" as described in step 1204, and use those to determine optimal points as described in step 1206. In this example, the optimization system may find the optimal points without changing the values of GRP. That is, the optimized advertisement campaign may allocate a value of GRP of 25 to the television show "Kim of Queens" and a value of GRP of 20 to the television show "Dance Moms". However, the advertisement campaign may increase the reach to have a reach 3+ for "Kim of Queens" of 50% and for "Dance Moms" of 30%, resulting in a 10% increase in reach for each show. The optimization system may accomplish this by allocating resources more efficiently to each show.

The optimization system may optimize both the values of GRP and the reach to create an advertising campaign that efficiently reaches an audience without using an unnecessary amount of resources by accounting for the laws of diminishing returns and other non-linear relationships between resources used and audience reach. This may require modifying the optimal point on the reach curves of multiple media assets using the information from the reach curves of each of the multiple media assets, as described in step 1208. The original advertisement campaign may correspond to point 910 in graph 900, and this optimized advertisement campaign may correspond to point 914 in graph 900. The optimization system may allocate the values of GRP to reach the maximum number of unique audience members and hence maximize reach. The optimized advertisement campaign may allocate a value of GRP of 20 to the television show "Kim of Queens" and a value of GRP of 21 to the television show "Dance Moms". Due to this optimization, the advertisement campaign may have a reach 3+ for "Kim of Queens" of 49% and for "Dance Moms" of 32%. Hence, the reach for "Kim of Queens" may only decrease slightly despite the significant decrease in the value of GRP, while the reach of "Dance Moms" may increase significantly for only a small increase in the value of GRP.

The reach for "Kim of Queens" may be only decreased slightly despite the significant decrease in the value of GRP due to the non-linear relationship between reach and value of GRP as shown in graph 900. As seen by the movement from point 912 to point 914 in graph 900, an increase or decrease in the value of GRP does not always result in a proportional increase or decrease in the reach. Hence, the optimization system significantly decreases the value of GRP of "Kim of Queens" without significantly decreasing the reach of this television show.

In some embodiments, the optimization system may allocate any GRP saved by optimization to another advertising campaign. For example, the optimization campaign may save a value of GRP of 4 by changing the value of GRP of "Kim of Queens" from 25 to 20, and the value of GRP of "Dance Moms" from 20 to 21. The optimization manager may allocate a value of GRP of 4 to the television show "Project Runway" to further increase the total reach of the advertising campaign. The optimization manager may select the television show "Project Runway" from a set of possible shows that could be added to the advertising campaign by determining which show of the set of possible shows would result in the greatest reach for the advertising campaign.

In an illustrative example, the optimization system may receive a pool of resources comprising a value of GRP of 30. A campaign manager may input information about a campaign into the optimization system that indicates the resources should be split among two television shows, "Kim of Queens" and "Dance Moms". The optimization system may determine reach curves for each television show, and determine an optimal point on each reach curve. The optimal point may correspond to point 514 in graph 500. The optimization system may determine that the optimal point for "Kim of Queens" is a reach of 45% for a value of GRP of 20, and the optimal point for "Dance Moms" is a reach of 40% for a value of GRP of 20. The optimization system may combine the two reach graphs to determine that the optimal point for both television shows combined is a reach of 50% for a value of GRP of 30. The optimization system may use this information to allocate a value of GRP of 17 to "Kim of Queens" to get a reach of 35% and a value of GRP of 13 to "Dance Moms" to get a reach of 30%. Hence, the modified optimal points for each show's reach curve may be different from the initially determined optimal points. Even though the reach for each show individually decreased due to the modification of the optimal points, the optimization system may have determined the most optimal allocation of the pool of resources.

In some embodiments, the optimization system may allocate a pool of resources between different mediums. For example, the optimization system may allocate a first amount of money to a print-based campaign and allocate a second amount of money to a radio-based campaign.

It is understood that although the above description refers to first and second media assets, the optimization system may determine rates associated with any number of media assets. It is also understood that the optimization system may compare values associated with any number of media assets. The optimization system may also recommend any number of media assets or values to the user.

It is contemplated that the steps or descriptions of FIG. 11 and/or FIG. 12 may be used with any other embodiment of this disclosure. In addition, the steps and descriptions described in relation to FIG. 11 and/or FIG. 12 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for recommending amounts of resources for use in reaching viewers during a media asset based on a non-linear relationship between reached viewers and an amount of resource used to reach the viewers, the method comprising:
   receiving a user input of a first value, wherein the first value corresponds to a first amount of units of a single resource a user desires to use to reach unique household viewers during a first media asset;
   retrieving, from a database, a mapping relationship between unique household viewers that are reached and an amount of units of the single resource used to reach the unique household viewers;
   determining a first rate indicative of a number of the unique household viewers per resource unit reached during the first media asset, should one additional unit of the single resource over the first amount of units be used to reach the unique household viewers during the first media asset by computing a slope of the mapping relationship at a point where the first amount of units of the single resource are used;
   comparing the first rate to a threshold rate, wherein the threshold rate corresponds to an acceptable minimum rate at which the number of unique household viewers reached during the first media asset may change;
   determining whether the first rate equals or exceeds the threshold rate based on comparing the first rate to the threshold rate; and
   in response to determining that the first rate does not equal or exceed the threshold rate, determining, based the mapping relationship, a second amount of units of the single resource that yields the threshold rate; and
   recommending a second value corresponding to the second amount of units of the single resource to the user, even when a second number of unique household viewers reached by the second amount of units of the single resource is lower than a first number of unique household viewers reached by the first amount of units of the single resource.

2. The method of claim 1, further comprising:
   comparing an identifier of the first media asset with a database listing graphical relationships indicating amounts of the single resource used and corresponding unique household viewers reached for a plurality of media assets; and
   retrieving a graphical relationship indicating amounts of the single resource used and corresponding numbers of unique household viewers reached for the first media asset.

3. The method of claim 1, further comprising, in response to determining that the first rate equals or exceeds the threshold rate, recommending the first value to the user.

4. The method of claim 1, wherein recommending a second value to the user further comprises:
   determining a second rate at which the number of the unique household viewers reached during the first media asset changes for the second value;
   comparing the second rate to the threshold rate; and
   determining that the second rate equals or exceeds the threshold rate.

5. The method of claim 1, wherein the threshold rate is selected by:
   determining an attribute of the first media asset; and
   comparing the attribute of the first media asset with a database listing threshold rates that correspond to a plurality of attributes to identify the threshold rate.

6. The method of claim 1, wherein the second value corresponds to a second amount of the single resource to reach unique household viewers during a second media asset.

7. The method of claim 6, wherein recommending the second value further comprises:
   determining that the second amount is less than or equal to the first amount; and
   determining that a second rate is greater than the first rate, wherein the second rate corresponds to a rate at which a number of the unique household viewers reached during the second media asset changes for the second value.

8. The method of claim 1, further comprising:
   determining a second rate at which a number of the unique household viewers reached during a second media asset changes for the first value;
   comparing the second rate to the first rate;
   determining whether the second rate equals or exceeds the first rate based on comparing the second rate to the first rate; and
   in response to determining that the first rate equals or exceeds the second rate, recommending the first media asset to the user.

9. The method of claim 1, wherein the single resource is an available number of advertising instances appearing in the first media asset.

10. A system for recommending amounts of resources for use in reaching viewers during a media asset based on a non-linear relationship between reached viewers and an amount of resource used to reach the viewers, the system comprising control circuitry configured to:
    receive a user input of a first value, wherein the first value corresponds to a first amount of units of a single resource a user desires to use to reach unique household viewers during a first media asset;

retrieve, from a database, a mapping relationship between a unique household viewers that are reached and an amount of units of the single resource used to reach the unique household viewers;

determine a first rate indicative of a number of the unique household viewers per resource unit reached during the first media asset, should one additional unit of the single resource over the first amount of units be used to reach the unique household viewers during the first media asset by computing a slope of the mapping relationship at a point where the first amount of units of the single resource are used;

compare the first rate to a threshold rate, wherein the threshold rate corresponds to an acceptable minimum rate at which the number of unique household viewers reached during the first media asset may change;

determine whether the first rate equals or exceeds the threshold rate based on comparing the first rate to the threshold rate; and in response to determining that the first rate does not equal or exceed the threshold rate, determine, based the mapping relationship, a second amount of units of the single resource that yields the threshold rate; and recommend a second value corresponding to the second amount of units of the single resource to the user, even when a second number of unique household viewers reached by the second amount of units of the single resource is lower than a first number of unique household viewers reached by the first amount of units of the single resource.

11. The system of claim 10, wherein the control circuitry is further configured to:

compare an identifier of the first media asset with a database listing graphical relationships indicating amounts of the single resource used and corresponding unique household viewers reached for a plurality of media assets; and retrieve a graphical relationship indicating amounts of the single resource used and corresponding numbers of unique household viewers reached for the first media asset.

12. The system of claim 10, wherein the control circuitry is further configured to, in response to determining that the first rate equals or exceeds the threshold rate, recommend the first value to the user.

13. The system of claim 10, wherein the control circuitry configured to recommend a second value to the user is further configured to:

determine a second rate at which the number of the unique household viewers reached during the first media asset changes for the second value;

compare the second rate to the threshold rate; and determine that the second rate equals or exceeds the threshold rate.

14. The system of claim 10, wherein the threshold rate is selected by using control circuitry configured to:

determine an attribute of the first media asset; and compare the attribute of the first media asset with a database listing threshold rates that correspond to a plurality of attributes to identify the threshold rate.

15. The system of claim 10, wherein the second value corresponds to a second amount of the single resource to reach unique household viewers during a second media asset.

16. The system of claim 15, wherein the control circuitry configured to recommend the second value is further configured to:

determine that the second amount is less than or equal to the first amount; and determine that a second rate is greater than the first rate, wherein the second rate corresponds to a rate at which a number of the unique household viewers reached during the second media asset changes for the second value.

17. The system of claim 10, wherein the control circuitry is further configured to:

determine a second rate at which a number of the unique household viewers reached during a second media asset changes for the first value;

compare the second rate to the first rate;

determine whether the second rate equals or exceeds the first rate based on comparing the second rate to the first rate; and in response to determining that the first rate equals or exceeds the second rate, recommend the first media asset to the user.

18. The system of claim 10, wherein the single resource is an available number of advertising instances appearing in the first media asset.

19. The method of claim 1, wherein the single resource comprises one of capital, labor, time, Gross Rating Points, advertising instances, or advertising slots.

20. The system of claim 10, wherein the single resource comprises one of capital, labor, time, Gross Rating Points, advertising instances, or advertising slots.

\* \* \* \* \*